United States Patent
Yamaura et al.

(10) Patent No.: US 12,218,752 B2
(45) Date of Patent: Feb. 4, 2025

(54) COMMUNICATION DEVICE, PROCESSOR, COMMUNICATION METHOD, AND COMPUTER PROGRAM PRODUCT

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Takahiro Yamaura, Kawasaki Kanagawa (JP); Yuta Kobayashi, Tokyo (JP)

(73) Assignees: Kabushiki Kaisha Toshiba, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 292 days.

(21) Appl. No.: 17/446,444

(22) Filed: Aug. 30, 2021

(65) Prior Publication Data
US 2022/0294556 A1    Sep. 15, 2022

(30) Foreign Application Priority Data
Mar. 12, 2021   (JP) .................. 2021-040208

(51) Int. Cl.
*H04L 1/00*    (2006.01)
(52) U.S. Cl.
CPC .......... *H04L 1/0045* (2013.01); *H04L 1/0061* (2013.01)

(58) Field of Classification Search
CPC ..... H04L 1/0045; H04L 1/0061; H04L 65/00; H04L 61/00; H04L 1/0078; H04L 12/54; H04W 80/02; H04W 80/06; H04W 80/04
See application file for complete search history.

(56) References Cited

U.S. PATENT DOCUMENTS

| | | | |
|---|---|---|---|
| 7,987,229 B1 * | 7/2011 | Kinne | G06F 13/385 709/200 |
| 2005/0213595 A1 * | 9/2005 | Shimizu | H04L 1/0061 370/428 |

(Continued)

FOREIGN PATENT DOCUMENTS

| | | |
|---|---|---|
| JP | H9-181771 A | 7/1997 |
| JP | 2009032053 | 2/2009 |

(Continued)

OTHER PUBLICATIONS

IEEE Standards Assoc., "Frame Replication and Elimination for Reliability (IEEE Std 802. 1CB™)," 102 pages (2017).

(Continued)

*Primary Examiner* — Ricky Q Ngo
*Assistant Examiner* — David M Kayal
(74) *Attorney, Agent, or Firm* — Finnegan, Henderson, Farabow, Garrett & Dunner, LLP

(57) ABSTRACT

According to an embodiment, a communication device includes a communication unit, a transfer unit, an error detection unit, and a transfer disablement control unit. The communication unit receives a frame. The transfer unit transfers the frame to a frame storage unit of a transfer destination. The error detection unit detects an error in the frame. The transfer disablement control unit disables transfer by the transfer unit when an error is detected by the error detection unit.

10 Claims, 21 Drawing Sheets

(56) References Cited

U.S. PATENT DOCUMENTS

| | | | | |
|---|---|---|---|---|
| 2007/0242682 A1* | 10/2007 | Kyusojin | .............. | H03M 13/09 |
| | | | | 370/401 |
| 2007/0279496 A1* | 12/2007 | Ishida | .................... | H04N 23/66 |
| | | | | 348/E5.043 |
| 2009/0031092 A1 | 1/2009 | Tsumura | | |
| 2015/0264142 A1* | 9/2015 | Yamaura | ............... | H04L 69/321 |
| | | | | 709/216 |
| 2019/0089646 A1* | 3/2019 | Yamaura | ............. | H04L 47/6215 |
| 2019/0289494 A1 | 9/2019 | Yamaura et al. | | |
| 2020/0092229 A1* | 3/2020 | Levi | ...................... | H04L 65/612 |
| 2021/0120552 A1* | 4/2021 | Fang | ................. | H04W 72/0446 |

FOREIGN PATENT DOCUMENTS

| | | | | |
|---|---|---|---|---|
| JP | 2019009613 | * | 6/2017 | .............. H04L 1/00 |
| JP | 2019-159812 A | | 9/2019 | |

OTHER PUBLICATIONS

IEEE Standards Assoc., "Bridges and Bridged Networks (IEEE Std 802.1Q™)," 1993 pages (2018).

* cited by examiner

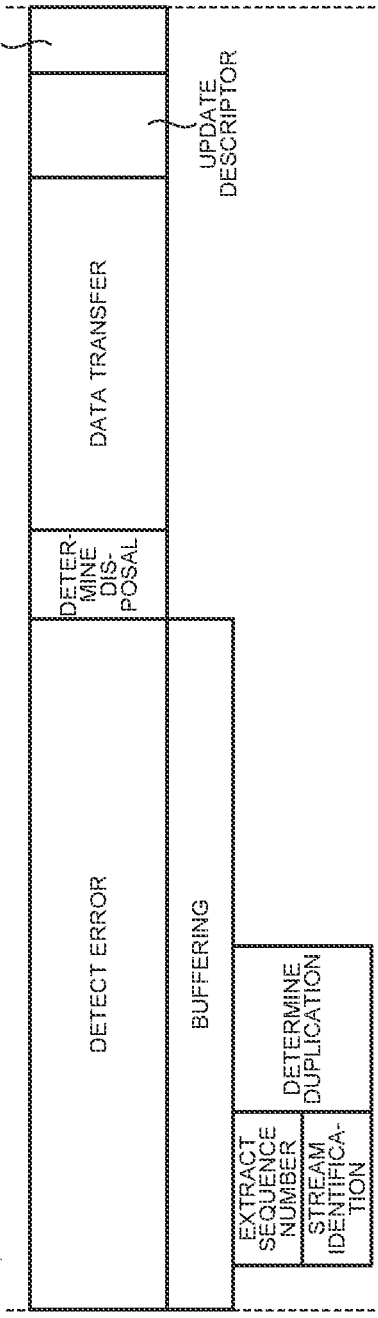
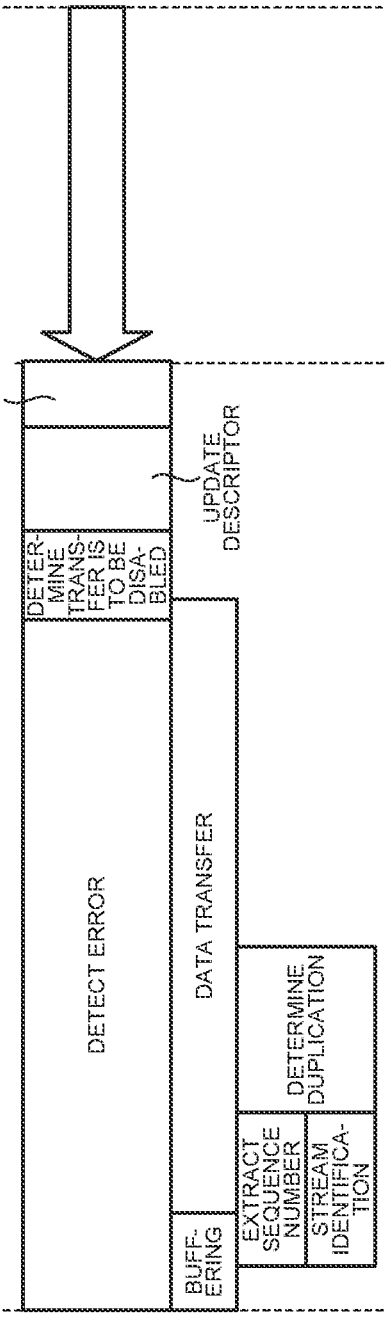
FIG.10

COMMUNICATION DEVICE, PROCESSOR, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2021-040208, filed on Mar. 12, 2021; the entire contents of which are incorporated herein by reference.

FIELD

Embodiments described herein relate generally to a communication device, a processor, a communication method, and a computer program product.

BACKGROUND

In IEEE 802.1CB, which is one of time-sensitive networking (TSN) standards, each replicated frame has a sequence number, and high reliability is achieved by transmitting multiple frames. In this standard, a removal process is performed on a previously received frame (duplicate frame) on the reception side. However, because there may be an error in the frame, it is defined that the removal process is to be performed after checking the consistency of data in the frame.

BRIEF DESCRIPTION OF THE DRAWINGS

FIG. 10 is a diagram for explaining a process performed on a non-duplicate frame in the first embodiment;

DETAILED DESCRIPTION

According to an embodiment, a communication device includes a communication unit, a transfer unit, an error detection unit, and a transfer disablement control unit. The communication unit receives a frame. The transfer unit transfers the frame to a frame storage unit of a transfer destination. The error detection unit detects an error in the frame. The transfer disablement control unit disables transfer by the transfer unit when an error is detected by the error detection unit.

Hereinafter, embodiments of a communication device, a processor, a communication method, and a computer program product will be described in detail with reference to the accompanying drawings.

If a sequence number of a frame is stored as a previously received sequence number, without checking if there is an error in the frame, and if a de-duplication process is performed on the received frame, a wrong sequence number will be processed as being received. Thus, if there is an error in the frame, a removal process may be performed on the frame that should not be de-duplicated. To avoid this situation, in IEEE 802.1CB, it is defined that the removal process be performed after checking the consistency of data in the frame. Consequently, the data consistency needs to be checked before transferring data the host.

Hereinafter, embodiments for reducing the transfer delay caused by checking data consistency will be described in detail.

First Embodiment

First, an example of a hardware configuration of a communication device in a first embodiment will be described.

Example of Hardware Configuration

Figure 1:
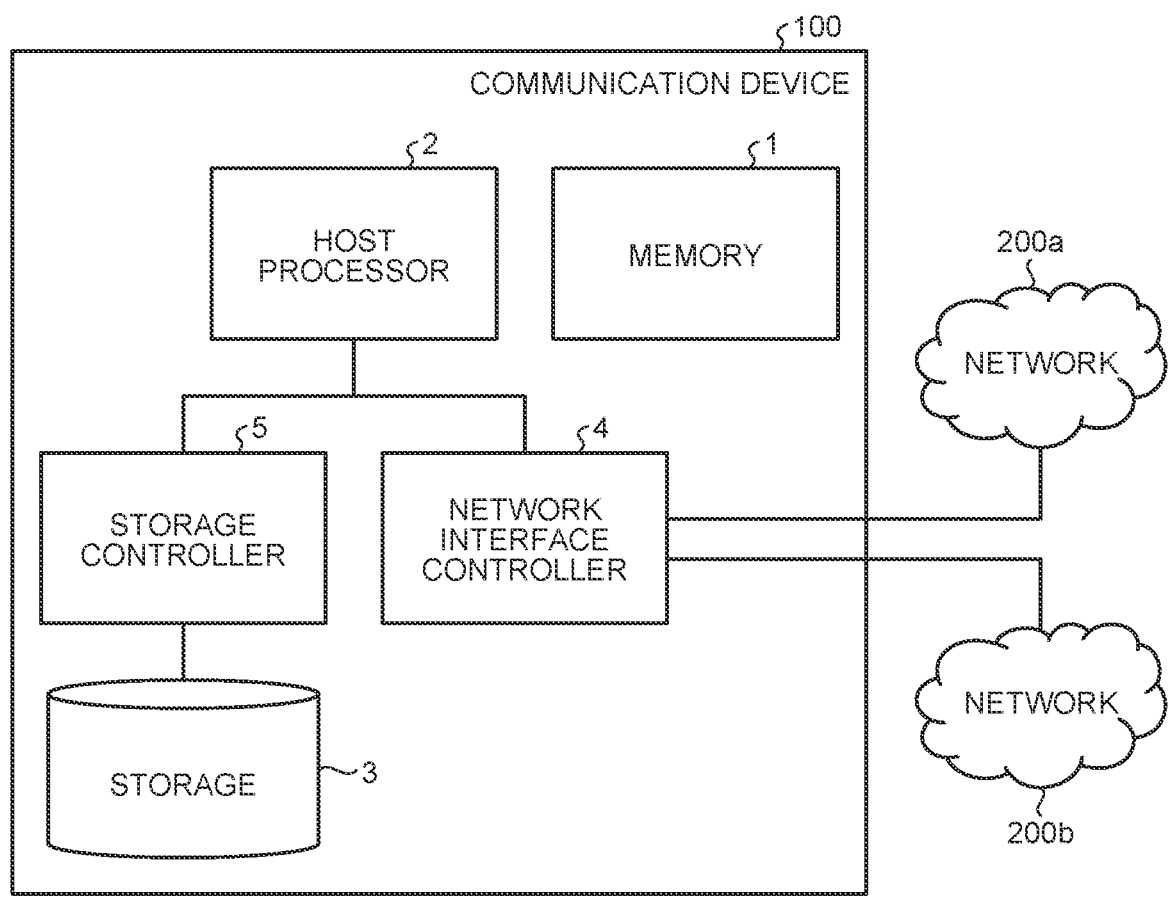
FIG. 1 is a diagram illustrating an example of a hardware configuration of a communication device in a first embodiment.

FIG. 1 is a diagram illustrating an example of a hardware configuration of a communication device 100 in the first embodiment. The communication device 100 of the present embodiment includes a memory 1, a host processor 2, a storage 3, a network interface controller 4, and a storage controller 5.

The memory 1 is connected to the host processor 2 via a memory controller in the host processor 2. For example, the memory 1 is implemented by a dynamic random access memory (DRAM) and the like.

The host processor 2 is connected to the storage controller 5 using a bus such as a Peripheral Component Interconnect (PCI) Express (registered trademark). Similarly, the host processor 2 is connected to the network interface controller 4, using a bus such as a PCI Express (registered trademark).

The host processor 2 develops an image of an execution program stored in the storage 3 on the memory 1, and executes a process while reading the instructions and data on the memory 1. The process is executed by one or more cores of the host processor 2. In FIG. 1, the memory 1 and the host processor 2 are separated. However, in FIG. 2 and thereafter, a configuration implemented by combining the memory 1 and the host processor 2 in FIG. 1 will be described as a functional configuration of a host processor.

For example, the storage 3 is implemented by a hard disk drive (HDD), a solid state drive (SSD), and the like. The storage 3 is connected to the storage controller 5 via a standard such as a serial advanced technology attachment (SATA), a serial attached small computer system interface (SAS), U.2 (SFF-8639), and the like. The storage 3 and the storage controller 5 may also be integrally formed.

The network interface controller 4 connects the host processor 2 to networks 200a and 200b. Hereinafter, if the network 200a and the network 200b need not be distinguished from each other, the network 200a and the network 200b are simply referred to as a network 200. For example, the network 200 is Ethernet (registered trademark). For example, the network interface controller 4 includes two physical Ethernet ports, and each of the ports may be connected to the network 200a or the network 200b. For example, the network 200 corresponds to a Virtual LAN (VLAN) defined in IEEE 802.1Q.

There may be two networks 200 as illustrated in FIG. 1, or there may be one, or three or more. The number of the networks 200 does not have to match the number of physical Ethernet ports, and a plurality of networks may be connected to a single Ethernet port by dividing the ID of the VLAN. Moreover, the type of the network 200 is optional. More specifically, for example, the network 200 is an office network, a network inside a data center, an on-vehicle network, an in-plant network, a mobile base station network, a core facility network, and the like.

For example, the network interface controller 4 and the storage controller 5 are implemented by an application specific integrated circuit (ASIC), a field-programmable gate array (FPGA), or the like. The network interface controller 4 and the storage controller 5 may also be implemented by combining two or three of the ASIC, FPGA, and a processor. The network interface controller 4 and the storage controller 5 may also incorporate a memory different from the memory 1 described above. The network interface controller 4 and the storage controller 5 may be mounted as a chip different from the host processor 2, or may be mounted as a single chip such as a System-on-a-Chip (SoC).

Example of Functional Configuration

Figure 2:
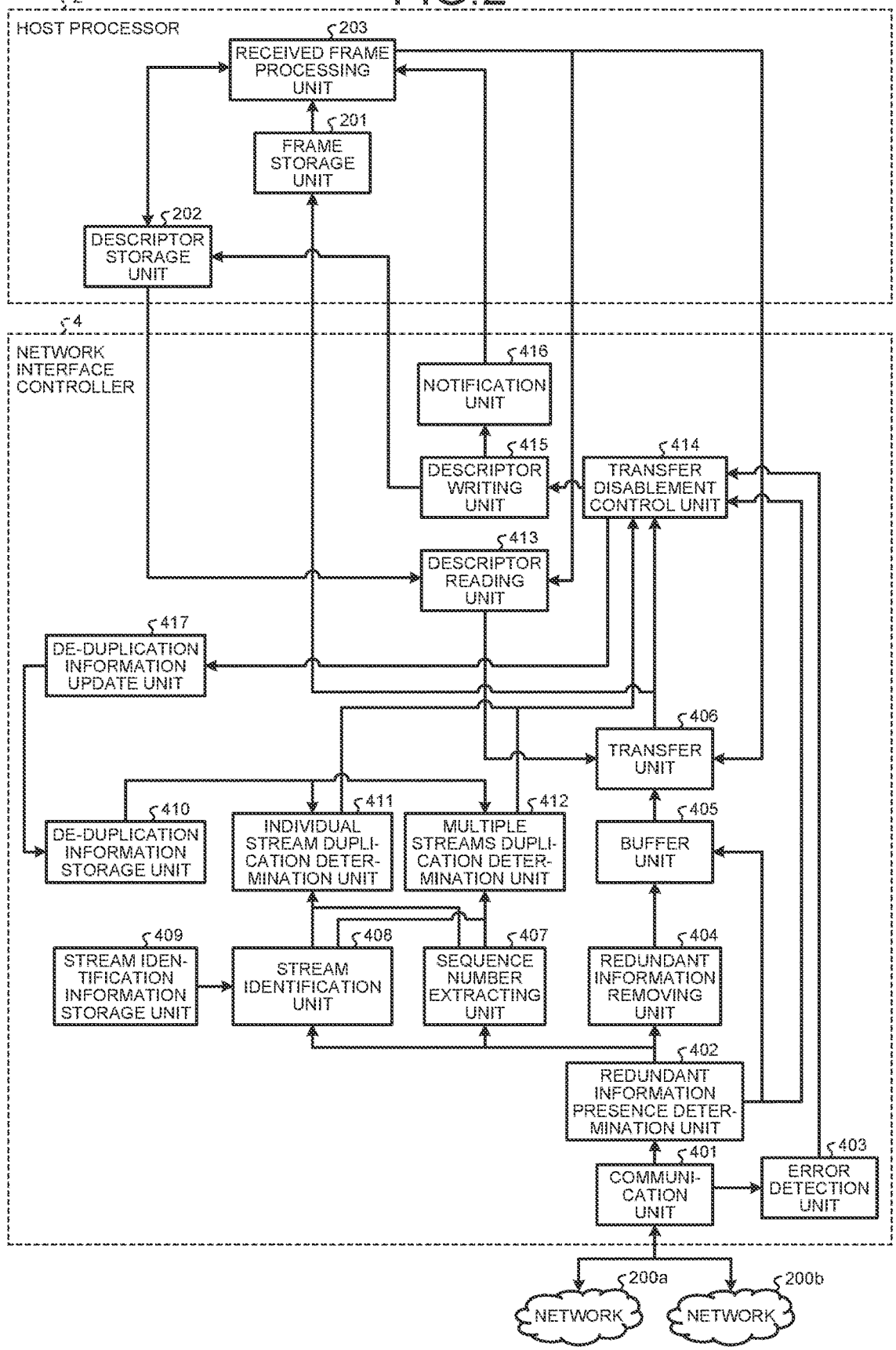
FIG. 2 is a diagram illustrating an example of a functional configuration of the communication device in the first embodiment.

FIG. 2 is a diagram illustrating an example of a functional configuration of the communication device 100 in the first embodiment. FIG. 2 mainly illustrates an example of a functional configuration of the host processor 2 and the network interface controller 4 in the communication device 100. As illustrated in FIG. 2, the host processor 2 includes a frame storage unit 201, a descriptor storage unit 202, and a received frame processing unit 203.

The frame storage unit 201 stores a frame received by the network interface controller 4.

The descriptor storage unit 202 is used for controlling the network interface controller 4. The descriptor is an example of meta-information used for data transfer in the frame. For example, the descriptor is configured as a ring buffer, and is managed using two variables of Head and Tail.

Figure 3:
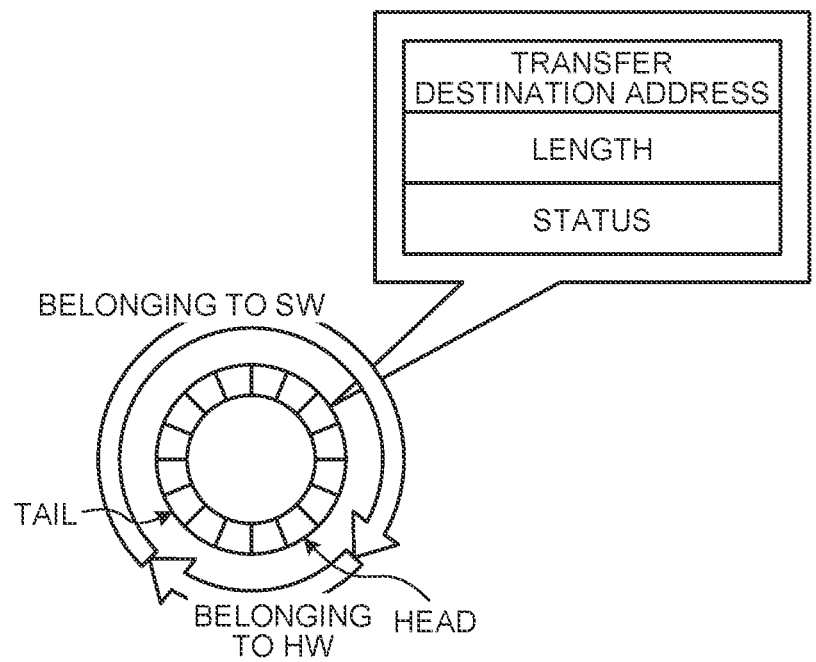
FIG. 3 is a diagram illustrating an example of a descriptor in the first embodiment.

FIG. 3 is a diagram illustrating an example of a descriptor in the first embodiment. As illustrated in FIG. 3, a descriptor from the Head to the Tail-1 indicates a descriptor belonging to hardware (HW), that is, the network interface controller 4. A descriptor from the Tail to the Head-1 is a descriptor belonging to software (SW), that is, software (received frame processing unit 203) operated on the host processor 2.

If the value of the Head is matched with the value of the Tail, it means that all descriptor entries belong to SW, and that there is no writable descriptor entry in the HW. The values of the Head and the Tail are transmitted between the network interface controller 4 and the host processor 2, using a register interface and an interrupt signal from a notification unit 416 of the network interface controller 4, which will be described below.

Each entry (each descriptor) of a reception descriptor ring includes a transfer destination address, the length, and status. The transfer destination address indicates the starting address, which is the starting position of a storage area in the frame storage unit 201 (for example, a memory connected to the host processor 2) for storing the received frame. The length indicates the length of the received frame. In the status, information indicating the state of the reception process will be stored.

Figure 4:
FIG. 4 is a diagram illustrating an example of status in the descriptor in the first embodiment.

FIG. 4 is a diagram illustrating an example of status in the descriptor in the first embodiment. In the example of FIG. 4, the status field includes a write complete flag and a fault flag.

The received frame processing unit 203 sets the write complete flag to 0 (write incomplete). If the network interface controller 4 finishes transferring the frame, and if the frame and the descriptor are finished being written, the received frame processing unit 203 sets the write complete flag to 1 (write complete).

The received frame processing unit 203 sets the fault flag to 0 (no error). If a data overflow, a data underrun, or the like occurs during the data transfer from the network interface controller 4, the received frame processing unit 203 sets the fault flag to 1. If there is no error, the received frame processing unit 203 sets the fault flag to 0.

The transfer destination address is set by the received frame processing unit 203, and the length and status are set by the network interface controller 4.

For example, the received frame processing unit 203 is implemented by a device driver of the operating system (OS), a user application, and the like. The received frame processing unit 203 allocates an area for writing a received frame in the frame storage unit 201, and sets the area in the descriptor storage unit 202. By being triggered by an interrupt notification from the network interface controller 4 and the like, the received frame processing unit 203 refers to the descriptor area, and if the frame data is finished being written to the frame storage unit 201, extracts the frame from the frame storage unit 201.

Returning to FIG. 2, the network interface controller 4 includes a communication unit 401, a redundant information presence determination unit 402, an error detection unit 403, a redundant information removing unit 404, a buffer unit 405, a transfer unit 406, a sequence number extracting unit 407, a stream identification unit 408, a stream identification information storage unit 409, a de-duplication information storage unit 410, an individual stream duplication determination unit 411, a multiple streams duplication determination unit 412, a descriptor reading unit 413, a transfer disablement control unit 414, a descriptor writing unit 415, the notification unit 416, and a de-duplication information update unit 417.

The communication unit 401 includes a function referred to as a media access controller (MAC) and a physical layer (PHY), and performs a process required for transmitting and receiving a frame according to protocols of the data link layer and the physical layer of the network. For example, the communication unit 401 processes the data link layer and the physical layer of Ethernet defined in IEEE 802.3 standard.

Figure 5:
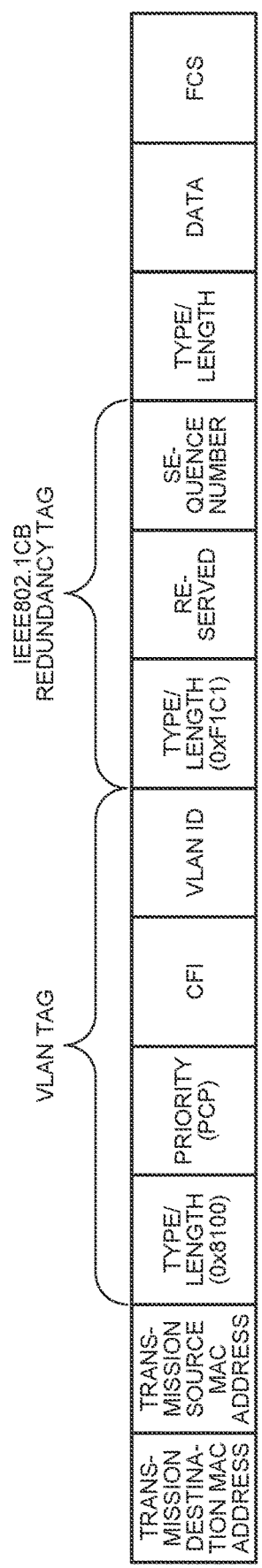
FIG. 5 is a diagram illustrating an example of a format of a frame in the first embodiment.

FIG. 5 is a diagram illustrating an example of a format of a frame in the first embodiment. As illustrated in FIG. 5, the frame includes a transmission destination MAC address, a transmission source MAC address, a VLAN tag, a redundancy tag, type/length, data, and a frame check sequence (FCS). The VLAN tag is defined in IEEE 802.1Q, and the redundancy tag is defined in IEEE 802.1CB. The order of the VLAN tag and the redundancy tag is not limited to this order, and may be in reverse order. Another tag may also be inserted before or after the VLAN tag and the redundancy tag, or may be inserted between the VLAN tag and the redundancy tag.

Returning to FIG. 2, the redundant information presence determination unit 402 determines whether redundant information is present in the frame received by the communication unit 401. The redundant information is information indicating that the frame is made redundant. For example, the redundant information presence determination unit 402 parses the frame from the start, and determines if there is a redundancy tag defined in IEEE 802.1CB in which the type/length field is 0xF1C1. If redundancy is carried out using high-availability seamless redundancy (HSR), the redundant information presence determination unit 402 may also determine if there is a tag referred to as an HSR sequence tag (hereinafter, an HSR tag). If a parallel redundancy protocol (PRP) is used, the redundant information presence determination unit 402 may also detect a trailer referred to as a PRP sequence trailer (hereinafter, a PRP trailer).

The error detection unit 403 performs a process of detecting if there is an error in the frame received by the communication unit 401. For example, if the data link layer is Ethernet, the error detection unit 403 adds a cyclic redundancy code (CRC) calculated using the value of a field other than the FCS field, to the FCS field. Then, the error detection unit 403 on the reception side calculates the CRC from the received frame, and if the value does not match the value set in the FCS field, detects an error (damage and loss).

The error detection unit 403 may also detect an error in the wireless LAN defined in IEEE 802.11 similarly to Ethernet. The error detection unit 403 may also check the header checksum value of Internet Protocol version 4 (IPv4), which is a higher-order layer protocol and a protocol of a network layer, checksum values of a transmission control protocol (TCP) and a user datagram protocol (UDP), which are protocols of a transport layer, and the like, and detect an error if the checksum values do not match.

The redundant information removing unit 404 removes redundant information from the frame received by the communication unit 401. For example, the redundant information removing unit 404 removes the redundancy tag portion illustrated in FIG. 5. That is, the frame output from the redundant information removing unit 404 includes the transmission destination MAC address, transmission source MAC address, type/length (0x8100), priority (PCP), CFI, VLAN ID, type/length, data, and FCS. If the HSR, the PRP, or the like is used, the redundant information removing unit 404 may also remove the HSR tag and the PRP trailer. Moreover, the redundant information removing unit 404 may also remove the FCS at this point. An arrangement is also possible in which the redundant information removing unit 404 not remove the FCS, and an FCS removing unit be provided in the subsequent stage of the redundant information removing unit 404.

The buffer unit 405 temporarily stores the frame received by the communication unit 401, or the frame from which the redundancy tag, the FCS, and the like are removed. For example, the buffer unit 405 is used for temporarily storing data until the data reaches the unit to be processed by the transfer unit 406. For example, if the bus width of the transfer unit 406 is 512 bits, the buffer unit 405 temporarily stores data in a unit of 512 bits. Because the memory connected to the host processor 2 is generally made of DRAM, it is more effective to perform a burst transfer. Consequently, the buffer unit 405 may also buffer until the data reaches a predetermined burst length.

The transfer unit 406 acquires a transfer destination address of the frame from the descriptor reading unit 413, which will be described below, and writes the transfer destination address into the transfer destination address of the frame storage unit 201.

The sequence number extracting unit 407 extracts a sequence number from the transmitted frame, which is made redundant. If a redundancy tag defined in IEEE 802.1CB is attached, the sequence number extracting unit 407 acquires a sequence number from a sequence number field of the redundancy tag (an example of redundant information). If the HSR is used, the sequence number extracting unit 407 may acquire a sequence number from the HSR tag. Moreover, if the PRP is used, the sequence number extracting unit 407 may also acquire a sequence number from the PRP trailer.

The stream identification unit 408 identifies a stream including at least one frame. The stream is a series of flows of frames from one transmission side to one or more reception sides. The stream is identified by the transmission destination MAC address, transmission source MAC address, VLAN ID, transmission destination IP address, transmission source IP address, and the like.

More specifically, for example, the method for identifying a stream is defined in IEEE 802.1CB, and is performed by the following methods.

(1) Combination of transmission destination MAC address and VLAN ID (2) Combination of transmission source MAC address and VLAN ID (3) Transmission destination MAC address, VLAN ID, transmission destination IP address, transmission source IP address, priority of IP packet (differentiated services code point (DSCP)), IP upper layer protocol, transmission source port number, and transmission destination port number An identifier referred to as a stream handle is assigned to the stream identified by the methods described above.

Information used for identifying a stream by the stream identification unit 408 is stored in the stream identification information storage unit 409. More specifically, for example, in the stream identification information storage unit 409, information on the stream handle, an identifier of the physical Ethernet port that identifies the stream, and the direction toward which the stream is identified (transmission direction or reception direction) will be recorded.

The de-duplication information storage unit 410 holds de-duplication information used for removing duplication from the duplicated streams, and for bringing the streams back to an individual stream.

For example, the de-duplication information includes a plurality of entries in which a combination of the following information is considered as a single entry.

(1) A list of streams to be de-duplicated so that an individual stream is formed (a list of stream handles)
(2) A list of physical Ethernet ports to be de duplicated (a list of identifiers of Ethernet ports)
(3) A direction toward which de-duplication is performed in the physical Ethernet ports (transmission direction or reception direction)
(4) Sequence number history used for de-duplication
(5) Identifier indicating whether the entry is used for de-duplication in an individual stream or whether the entry is used for de-duplication in multiple streams The individual stream duplication determination unit 411 determines whether the sequence number of the received frame has been previously received, using the de-duplication information of the individual stream stored in the de-duplication information storage unit 410. In the de-duplication information of the individual stream, the number received in the individual stream will be recorded. For example, if a frame with the sequence numbers 5 is received in a stream A, after receiving frames with the sequence numbers 4 and 5 in the stream A, the individual stream duplication determination unit 411 determines that the frame has been received (duplicated).

The multiple streams duplication determination unit 412 determines whether the sequence number of the received frame has been previously received, using the de-duplication information of the multiple streams stored in the de-duplication information storage unit 410. In the de-duplication information of the multiple streams, the number received in one of the streams will be recorded. For example, if the stream A and the stream B are listed in the list of the streams on which de-duplication is to be performed, and if frames with the sequence numbers 1 and 3 are received in the stream A, and if frames with the sequence numbers 2 and 4 are received in the stream B, the received sequence numbers in the multiple streams of the streams A and B are 1, 2, 3, and 4. In this process, if a frame with the sequence number 4 is received in the stream A, the multiple streams duplication determination unit 412 determines that the frame is duplicated, because the frame with the sequence number 4 has been previously received in the stream B.

The individual stream duplication determination unit 411 and the multiple streams duplication determination unit 412 may also be implemented as a single duplication determination unit. The duplication determination unit may include the individual stream duplication determination unit 411 and the multiple streams duplication determination unit 412.

The descriptor reading unit 413 reads information on the descriptor stored in the memory connected to the host processor 2. Because it takes time to access the memory connected to the host processor 2, the descriptor reading unit 413 may cache the descriptor from the Head to the Tail-1 in advance.

The transfer disablement control unit 414 determines whether to disable data transfer from the output of the individual stream duplication determination unit 411, the multiple streams duplication determination unit 412, the error detection unit 403, and the redundant information presence determination unit 402.

For example, if there is no error in the newly received frame (non-duplicate frame), which is not a previously received frame, the transfer disablement control unit 414 writes the frame length, status, and the like to the descriptor via the descriptor writing unit 415.

If the received frame is a previously received frame, or if there is an error in the frame, the transfer disablement control unit 414 does not instruct the descriptor writing unit 415 to write to the descriptor (determines disposal). Moreover, if there is redundant information, if there is no duplication in the individual stream and the multiple streams, and if the error detection unit 403 does not detect any error in the Ethernet frame (or wireless LAN frame), the transfer disablement control unit 414 instructs the de-duplication information update unit 417 to update the de-duplication information of the individual stream and the multiple streams.

The descriptor writing unit 415 writes the frame length, status, and the like to the descriptor stored in the memory connected to the host processor 2. Upon finishing writing, the descriptor writing unit 415 instructs the notification unit 416 to make notification to the host processor 2. The notification may be collectively performed after a plurality of descriptor entries have been written.

By the instruction from the descriptor writing unit 415, the notification unit 416 notifies the host processor 2 that the descriptor is written by an interrupt. That is, when not disabling the transfer by the transfer unit 406, the transfer disablement control unit 414 updates the meta-information of the transferred frame and notifies the transfer destination that the meta-information is updated, via the notification unit 416. When disabling the transfer by the transfer unit 406, the transfer disablement control unit 414 does not update the meta-information of the transferred frame.

The de-duplication information update unit 417 updates the individual stream de-duplication information and the information on the multiple streams. More specifically, the de-duplication information update unit 417 records the individual stream de-duplication information corresponding to the received frame stored in the de-duplication information storage unit 410, and records the sequence number of the frame received this time, to the information on the received sequence number included in the multiple streams de-duplication information. The de-duplication information update unit 417 may also update the time when the frame is received.

Next, with reference to FIGS. 2, 6, 7, and 8, an example of an operation of the communication device 100 in the first embodiment will be described.

Figure 6:
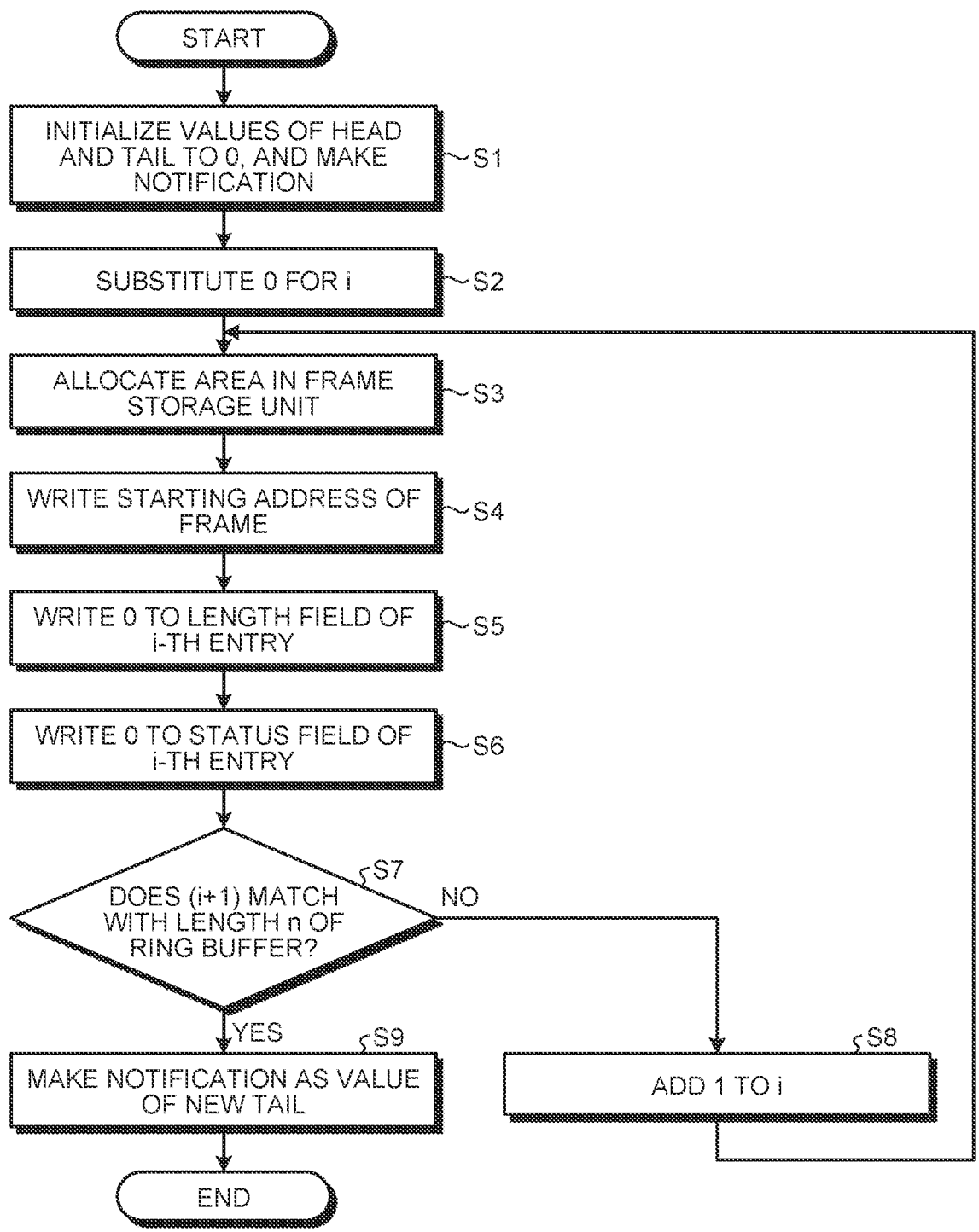
FIG. 6 is a flowchart illustrating an example of an initialization process of a host processor in the first embodiment.

FIG. 6 is a flowchart illustrating an example of an initialization process of the host processor 2 in the first embodiment. First, the received frame processing unit 203 initializes the positions of the Head and the Tail, which are variables for managing the descriptor stored in the descriptor storage unit 202, to 0, and makes notification to the network interface controller 4 (step S1). Hence, the values of the Head and the Tail are both set to 0, and the host processor 2 that operates software holds all the descriptors.

Next, the received frame processing unit 203 substitutes 0 for a variable i (step S2). Then, the received frame processing unit 203 allocates a storage area of the frame corresponding to the i-th descriptor entry, from the frame storage unit 201 (step S3). Next, the received frame processing unit 203 writes the starting address of the storage area to the transfer destination address field of the i-th descriptor entry (step S4).

Next, the received frame processing unit 203 writes 0 to the length field of the i-th descriptor entry (step S5). Then, the received frame processing unit 203 writes 0 to the status field (fault flag and write complete flag) of the i-th descriptor entry (step S6).

Next, the received frame processing unit 203 determines whether i+1 matches with the length n of the descriptor ring (step S7). If i+1 does not match with the length n of the descriptor ring (No at step S7), the received frame processing unit 203 adds 1 to i (step S8), and repeats the process on the i-th descriptor. On the other hand, if i+1 matches with the length n of the descriptor ring (Yes at step S7), the received frame processing unit 203 notifies the value i, that is, n−1, as a value of the new Tail, to the network interface controller 4 (step S9), and completes the initialization process.

Figure 7A:
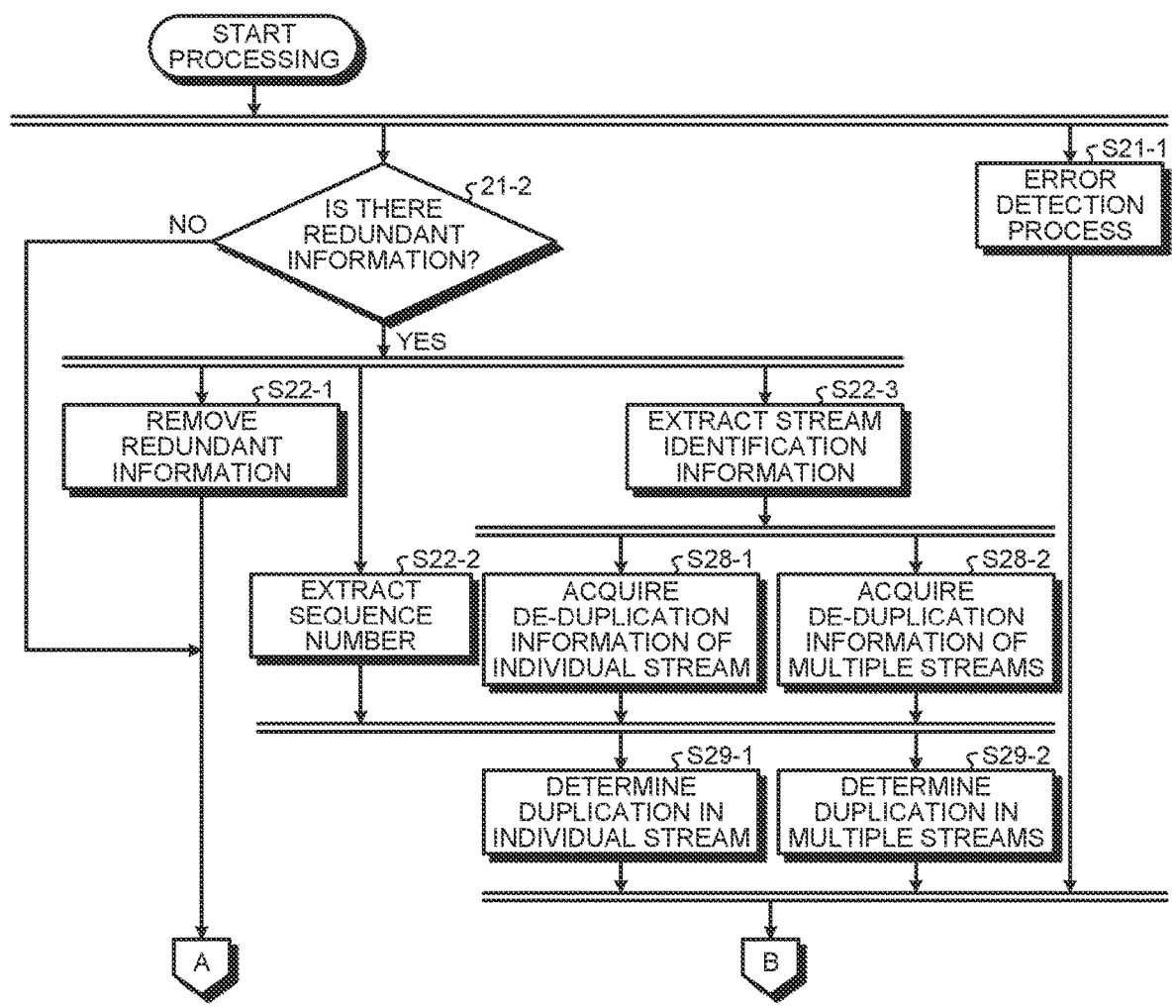
FIGS. 7A and 7B illustrate a flowchart illustrating an example of a frame reception process of a network interface controller in the first embodiment.
Figure 7B:
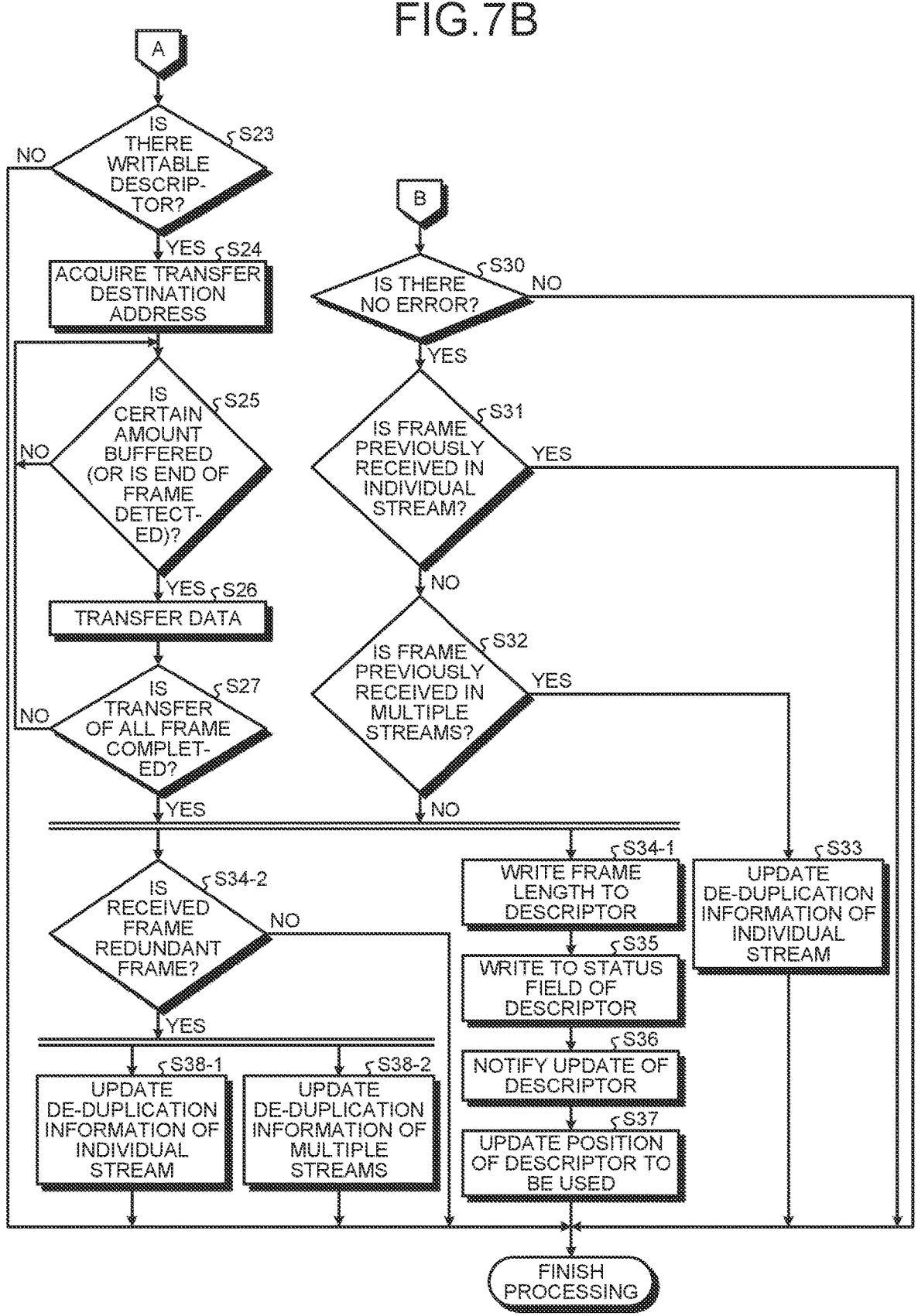

FIGS. 7A and 7B illustrate a flowchart illustrating an example of a frame reception process of the network interface controller 4 in the first embodiment. The double lines in FIGS. 7A and 7B indicate synchronization of parallel processes. First, if the communication unit 401 receives a frame, the error detection unit 403 checks if there is an error in the frame (step S21-1). In this example, an error is detected according to the specifications of protocols such as Ethernet, wireless LAN, IP, TCP, and UDP. For example, if the Ethernet frame is used, the error detection unit 403 calculates a CRC value for the field other than the FCS, checks whether the CRC value matches with the FCS value written in the FCS field, and if the values are matched, detects that there is no error.

In parallel with the process at step S21-1, the redundant information presence determination unit 402 determines if there is redundant information in the frame (step S21-2). In this example, for example, the redundant information presence determination unit 402 determines if there is a redundancy tag defined in IEEE 802.1CB, an HSR tag, and a PRP trailer in the frame. If there is redundant information (Yes at step S21-2), the redundant information removing unit 404 removes the redundant information from the frame output from the communication unit 401 (step S22-1). In this case, the redundant information removing unit 404 may also remove the FCS field. The data on the frame on which the removal process is performed is temporarily stored in the buffer unit 405.

If there is no redundant information (No at step S21-2), the frame is temporarily stored in the buffer unit 405 as it is. Subsequently, the transfer unit 406 determines if there is a writable descriptor (step S23). At step S23, it is determined whether the position of the currently used descriptor (position of Head) matches with the value of the Tail notified by the host processor 2.

If the position matches with the value (No at step S23), it is determined that there is no space in the descriptor, and the process will be finished.

If the position does not match with the value (Yes at step S23), the transfer unit 406 determines that there is space in the descriptor, and acquires the transfer destination address of the current descriptor entry via the descriptor reading unit 413 (step S24).

If a certain amount of data is accumulated in the buffer unit 405, or if the end of the frame is recorded in the buffer unit 405 (Yes at step S25), the transfer unit 406 writes data in the storage area of the frame starting from the transfer destination address. By repeating this process until the data transfer of all the frame is completed, the received frame is written into the frame storage unit 201 of the host processor 2. The certain amount is a value suitable for the transfer unit 406 to perform data transfer, and is specified by multiples of the unit of the data transfer performed by the transfer unit 406, and the like. The buffer unit 405 buffers not all but some of the frame, and the buffered frame is transferred by the transfer unit 406.

In parallel with the redundant information removal process at step S22-1, an extraction process of a sequence number will be performed (S22-2). The sequence number extraction process is performed when the sequence number extracting unit 407 extracts a sequence number in the redundant information of the frame.

In parallel with the process performed by the redundant information removing unit 404 at step S22-1, an extraction process of stream identification information will be performed (step S22-3). This process is performed by the stream identification unit 408. The stream is identified using information in the Ethernet header, VLAN tag, IP header, and the like. More specifically, in the stream identification information storage unit 409, fields used for identifying a stream by the user program in the host processor 2 and the like, values of the fields, and the like are recorded in advance with an identifier referred to as a stream handle. The stream identification unit 408 obtains a stream handle corresponding to the currently received frame, using the information in the stream identification information storage unit 409 recorded in advance.

The individual stream duplication determination unit 411 and the multiple streams duplication determination unit 412 each acquire de-duplication information stored in the de-duplication information storage unit 410 from the information on the obtained stream handle (step S28-1 and step S28-2). That is, the individual stream duplication determination unit 411 and the multiple streams duplication determination unit 412 each acquire the individual stream de-duplication information used for duplication determination of the individual stream, and the multiple streams de-duplication information used for duplication determination of the multiple streams. By using the de-duplication information acquired in this manner, the individual stream duplication determination unit 411 and the multiple streams duplication determination unit 412 perform duplication determination. The individual stream duplication determination unit 411 refers to the received sequence number in the de-duplication information of the individual stream, and if the sequence number of the received frame has been previously received, determines that there is duplication. The multiple streams duplication determination unit 412 refers to the received sequence number in the de-duplication information of the multiple streams, and if the sequence number of the received frame has been previously received, determines that there is duplication.

The transfer disablement control unit 414 determines whether the descriptor is to be written (disabling transfer), from the output of the individual stream duplication determination unit 411, the multiple streams duplication determination unit 412, the error detection unit 403, and the redundant information presence determination unit 402. First, if there is an error in the frame in the error detection process (step S21-1) (No at step S30), the transfer disablement control unit 414 does not write to the descriptor or make notification to the host processor 2, and finishes the process.

If there is no error in the frame (Yes at step S30), and if it is determined that the frame has been previously received in the individual stream, that is, if it is determined that there is duplication in the individual stream (Yes at step S31), the transfer disablement control unit 414 does not write to the descriptor or make notification to the host processor 2, and finishes the process.

If it is determined that there is no duplication in the individual stream (No at step S31), the transfer disablement control unit 414 determines if there is duplication in the multiple streams (step S32). If it is determined that the frame has been received in the multiple streams, that is, if it is determined that there is duplication in the multiple streams (Yes at step S32), the transfer disablement control unit 414 does not write to the descriptor, make notification to the host processor 2, or the like, and updates the de-duplication information of the individual stream (step S33), and finishes the process. The de-duplication information is updated such that the received sequence number is added, the received timing is recorded, and the like.

If it is determined that there is no duplication in the multiple streams (No at step S32), and if data transfer of all the frame is completed (after completing the process at step S27), the transfer disablement control unit 414 instructs the descriptor writing unit 415 to write to the descriptor. Next, the instructed descriptor writing unit 415 first writes the length of the data transferred by the transfer unit 406, into the length field in the descriptor (step S34-1).

Next, the descriptor writing unit 415 writes to the status field of the descriptor (step S35). In the status field, the descriptor writing unit 415 writes if there is an error in the data transfer in the fault flag, and writes 1 in the write complete flag. Next, the descriptor writing unit 415 notifies the host processor 2 that the descriptor is written (updated) via the notification unit 416, using an interrupt and the like (step S36). Finally, the descriptor writing unit 415 advances the position of the descriptor (position of Head) to be used to the next descriptor entry (step S37).

In parallel with the write process to the descriptor described above, if the received frame is a frame that has been made redundant (redundant information is present) (Yes at step S34-2), the transfer disablement control unit 414 updates the de-duplication information of the individual stream and the multiple streams, and finishes the process (step S38-1 and step S38-2). If the received frame is not a frame that has been made redundant (redundant information is not present) (No at step S34-2), the transfer disablement control unit 414 does not update the de-duplication information of the individual stream and the multiple streams, and finishes the process.

Figure 8:
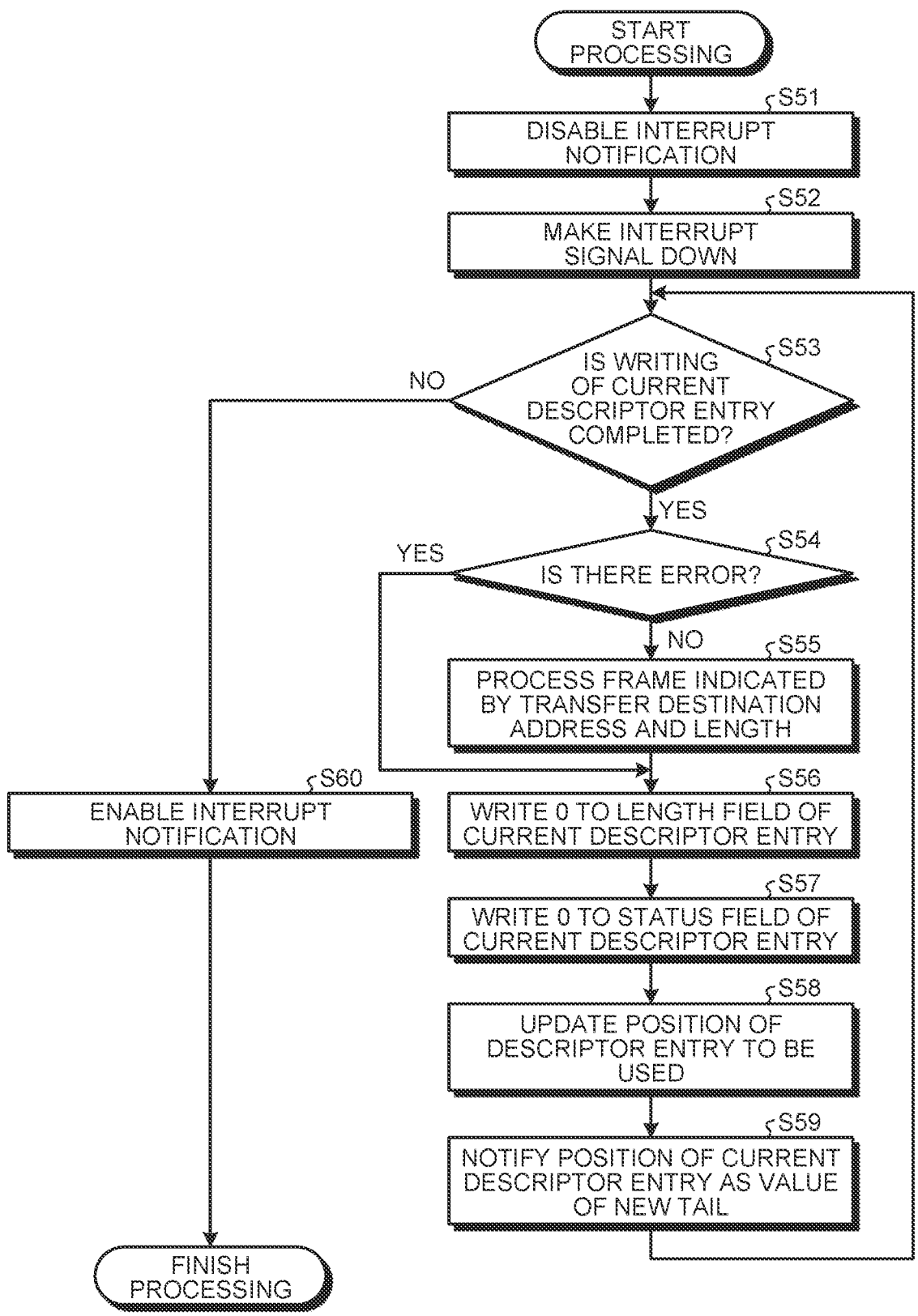
FIG. 8 is a flowchart illustrating an example of a frame reception process of the host processor in the first embodiment.

FIG. 8 is a flowchart illustrating an example of a frame reception process of the host processor in the first embodiment. First, upon receiving an interrupt from the network interface controller 4, the received frame processing unit 203 disables the interrupt notification (step S51), and makes the interrupt signal down (step S52).

Next, the received frame processing unit 203 checks the write complete flag in the status field of the current descriptor entry, and determines if the writing is completed (complete flag is 1) (step S53). If the writing is completed (Yes at step S53), the received frame processing unit 203 then checks the fault flag, and determines if there is an error (step S54). If there is an error (No at step S54), the received frame processing unit 203 does not process the frame, and proceeds to step S56.

If there is no error (No at step S54), the received frame processing unit 203 acquires the frame indicated by the transfer destination address and the length of the current descriptor entry from the frame storage unit 201, and processes the frame (step S55).

Next, the received frame processing unit 203 writes 0 to the length in the current descriptor entry (step S56). Next, the received frame processing unit 203 writes 0 to the status field (step S57). Hence, the fault flag, the write complete flag, and the like will be cleared. Next, the received frame processing unit 203 updates the position of the descriptor entry to be used next (step S58), and notifies the position in the current descriptor entry to the network interface controller 4 as a new Tail (step S59). As long as the write finish flag is 1, the received frame processing unit 203 repeats the process (return to step S53).

If the write finish flag is 0, that is, if the writing is not completed (No at step S53), the received frame processing unit 203 enables the interrupt notification (step S60), and finishes the process.

Figure 9:
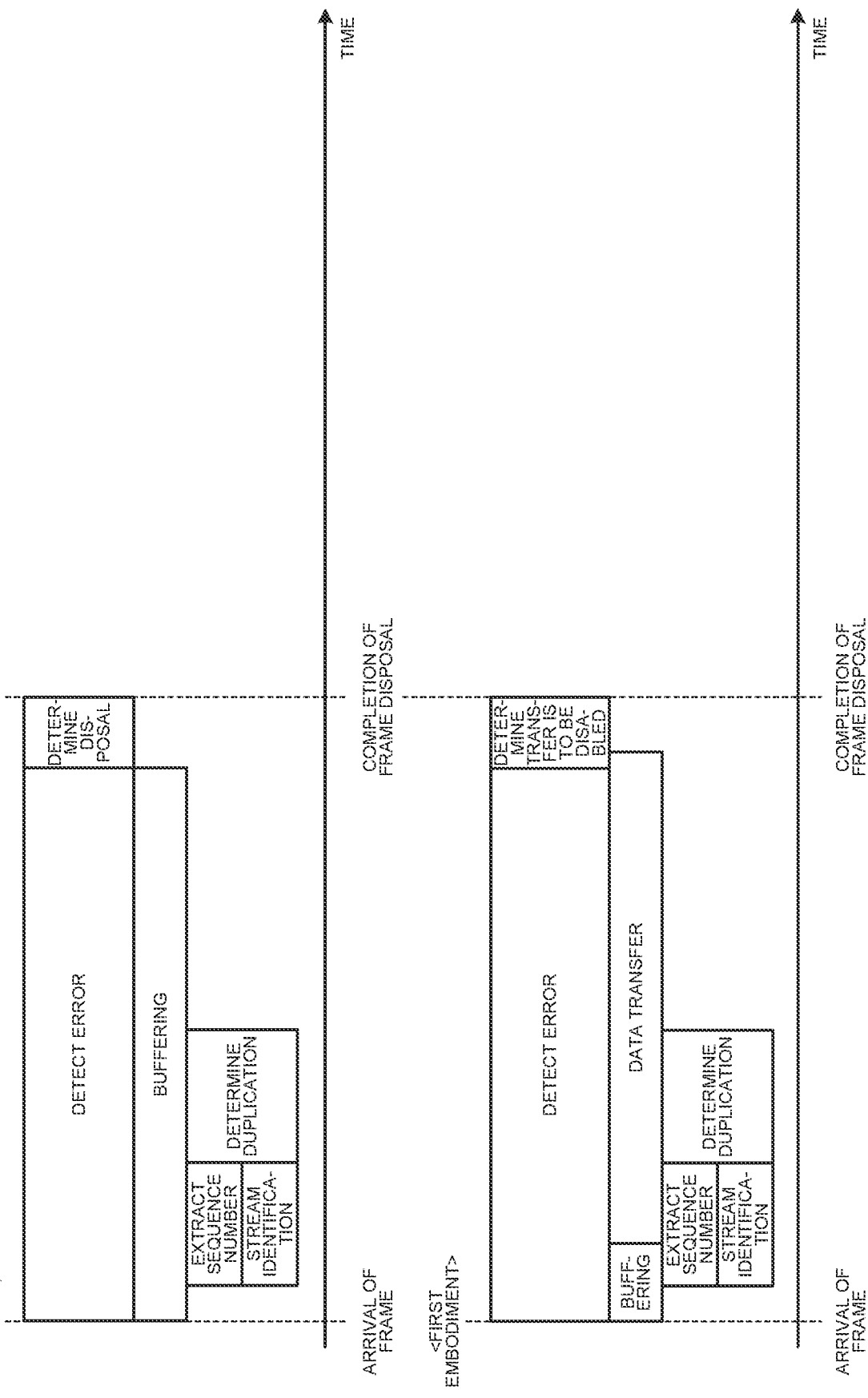
FIG. 9 is a diagram for explaining a process performed on a duplicate frame in the first embodiment.

FIG. 9 and FIG. 10 indicate the timing from when the frame has arrived to when the frame transfer is completed or to when the frame disposal is completed in the conventional example and the present embodiment.

FIG. 9 is a diagram for explaining a process performed on a duplicate frame in the first embodiment. FIG. 9 is an example of frame disposal because a duplicate frame is received. Conventionally, buffering is performed while an error is detected. If it is determined that there is no error but there is duplication, the frame is disposed of without being notified to the host processor 2. In the embodiment, data transfer is started after buffering a certain amount of data. However, the disposal is completed at the same time as the conventional example.

FIG. 10 is a diagram for explaining a process performed on a non-duplicate frame in the first embodiment. In FIG. 10, the network interface controller 4 receives a new non-duplicate frame, and makes notification to the host processor 2. Conventionally, all frames are once buffered, and data transfer is performed after confirming that there is no duplication. Thus, it takes time to complete the frame transfer. On the other hand, in the present embodiment, data transfer is started after buffering a certain amount of data. Thus, the time required for completing the frame transfer can be reduced.

As described above, in the communication device 100 in the first embodiment, the communication unit 401 receives a frame. The transfer unit 406 transfers the frame to the frame storage unit 201 of the transfer destination. The error detection unit 403 detects an error in the frame. If the error detection unit 403 detects an error, the transfer disablement control unit 414 disables the transfer by the transfer unit 406.

Hence, according to the communication device 100 in the first embodiment, it is possible to reduce the transfer delay caused by checking data consistency. More specifically, with the communication device 100 in the first embodiment, if duplication of the frame or an error in the frame is detected, the descriptor is not written, and the data transfer can be disabled. Thus, it is possible to perform data transfer immediately after receiving data, and reduce data transfer delay. Conventionally, the data of the received frame is started to be written only after the de-duplication process is completed. However, according to the communication device 100 in the first embodiment, data transfer can be started before the duplication determination. Thus, a frame reception process can be performed without much delay.

Second Embodiment

Next, a second embodiment will be described. In the second embodiment, the same descriptions as those in the first embodiment will be omitted, and only those different from the first embodiment will be described. The second embodiment is different from the first embodiment in the operation of the transfer disablement control unit 414 and the configuration of the status field of the descriptor entry.

Figure 11:
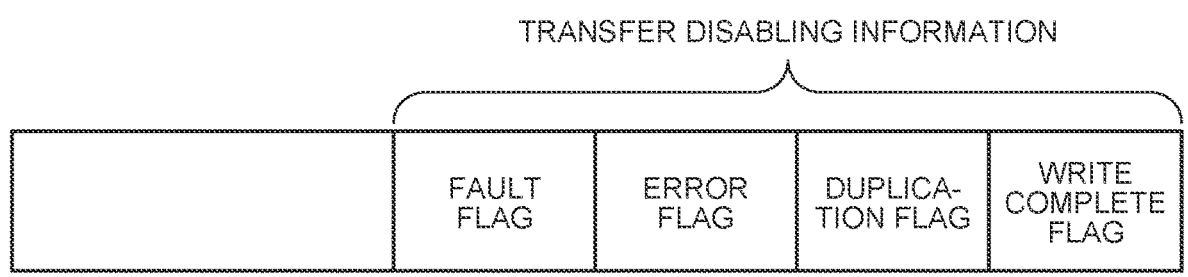
FIG. 11 is a diagram illustrating an example of status in the descriptor in a second embodiment.

FIG. 11 is a diagram illustrating an example of status in the descriptor in the second embodiment. The example of FIG. 11 is different from that in the first embodiment in including an error flag and a duplication flag in the status field, in addition to those in the first embodiment.

In an error detection process, the error flag is set to 1 if there is an error, and set to 0 if there is no error. In an individual stream duplication determination process and a multiple streams duplication determination process, the duplication flag is set to 0, if it is determined that there is no duplication in both processes, and set to 1, if it is determined that there is duplication in one of the processes.

The individual stream duplication flag and the multiple streams duplication flag may also be expressed in separate fields. The fault flag, the error flag, the duplication flag, and the like may be integrated, and whether to disable the frame may be expressed by a transfer disablement flag of 1 bit.

The transfer disablement control unit 414 in the second embodiment is different from the first embodiment in that the descriptor is always written, but the data transfer can be disabled, by writing the transfer disabling information such as the fault flag, the error flag, and the duplication flag in the status field of the descriptor entry. The transfer disabling information is information indicating that the transferred frame is disabled.

Figure 12A:
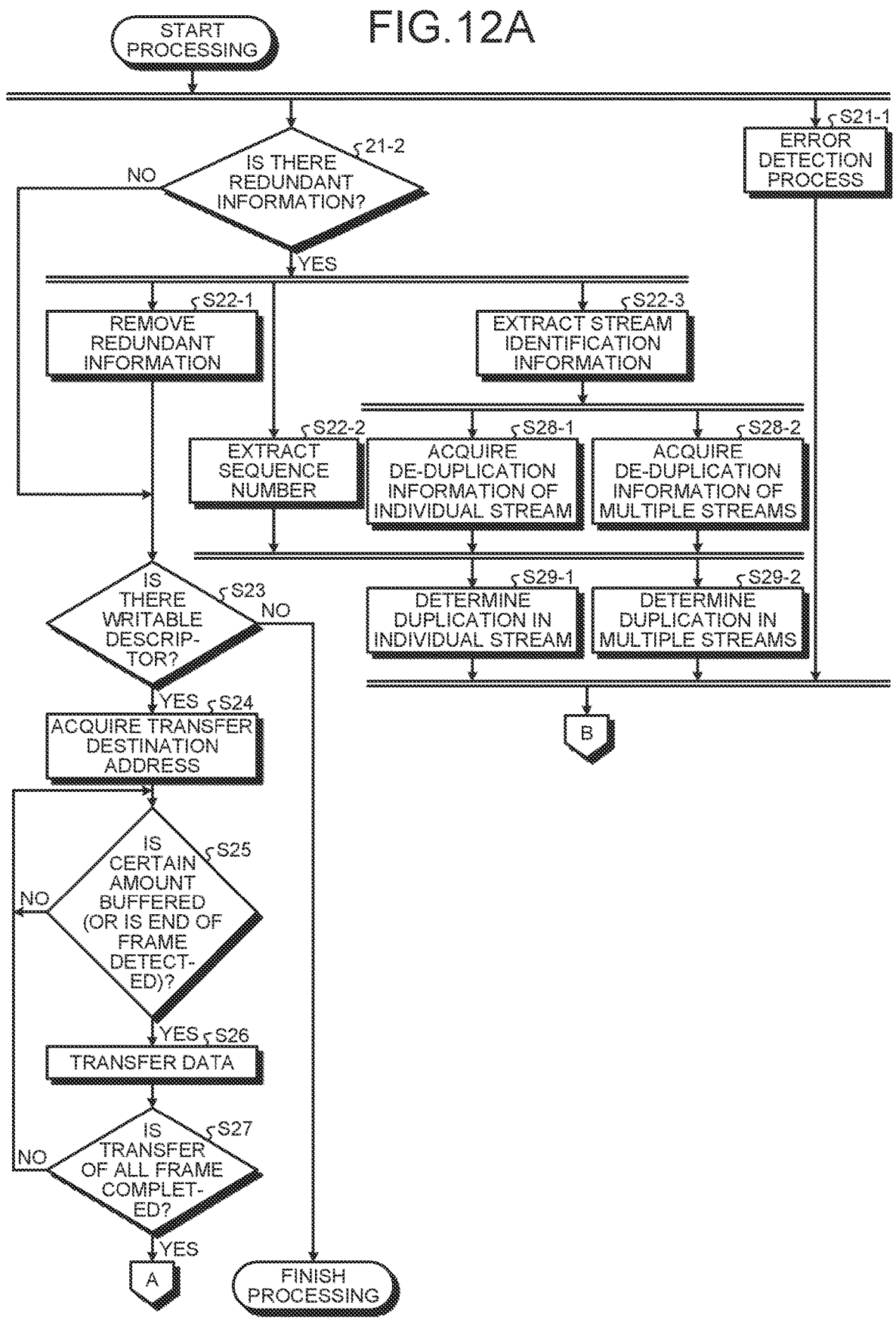
FIGS. 12A and 12B illustrate a flowchart illustrating an example of a frame reception process of a network interface controller in the second embodiment.
Figure 12B:
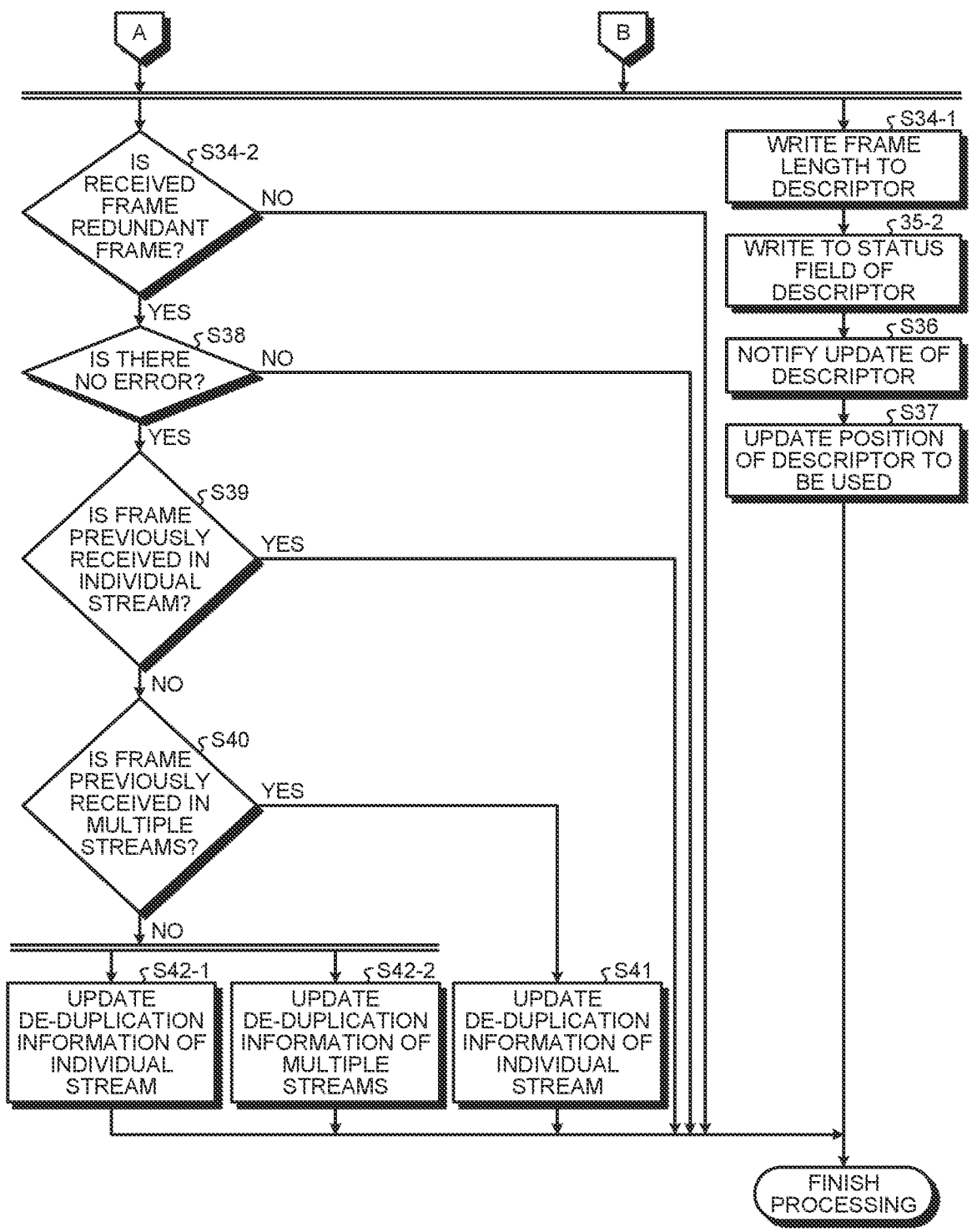

FIGS. 12A and 12B illustrate a flowchart illustrating an example of a frame reception process of the network interface controller 4 in the second embodiment. The second embodiment is different from the first embodiment in that whether to write to the descriptor is not determined after the duplication determination is performed on the individual stream and the multiple streams (step S29-1 and step S29-2), and the process performed when the received frame is determined as a frame that has been made redundant at step S34-2, and at step S35-2.

In the second embodiment, in parallel with the write process to the descriptor from step S34-1, it is determined whether the received frame is a frame that has been made redundant (step S34-2). If the received frame is not a frame that has been made redundant (redundant information is not present) (No at step S34-2), the transfer disablement control unit 414 does not update the de-duplication information of the individual stream and the multiple steams, and finishes the process.

If the received frame is a frame that has been made redundant (redundant information is present) (Yes at step S34-2), it is determined if there is an error in the frame in the error detection process (step S21-1) (step S38). If there is an error in the frame (No at step S38), the transfer disablement control unit 414 does not update the de-duplication information, and finishes the process.

If there is no error in the frame (Yes at step S38), and if it is determined that the frame has been previously received in the individual stream, that is, if it is determined that there is duplication in the individual stream (Yes at step S39), the transfer disablement control unit 414 does not update the de-duplication information, and finishes the process.

If it is determined that there is no duplication in the individual stream (No at step S31), the transfer disablement control unit 414 determines if there is duplication in the multiple streams (step S40). If it is determined that the frame has been received in the multiple streams, that is, if it determined that there is duplication in the multiple streams (Yes at step S40), the transfer disablement control unit 414 updates the de-duplication information of the individual stream (step S41), and finishes the process. The de-duplication information is updated such that the received sequence number is added, the received timing is recorded, and the like.

If it is determined that there is no duplication in the multiple streams (No at step S40), the transfer disablement control unit 414 updates the de-duplication information of the individual stream and the multiple streams, and finishes the process (step S42-1 and step S42-2).

At step S35-2 subsequent to step S34-1, the descriptor writing unit 415 writes to the error flag and the duplication flag in the status field, in addition to the fault flag and the write complete flag.

Figure 13:
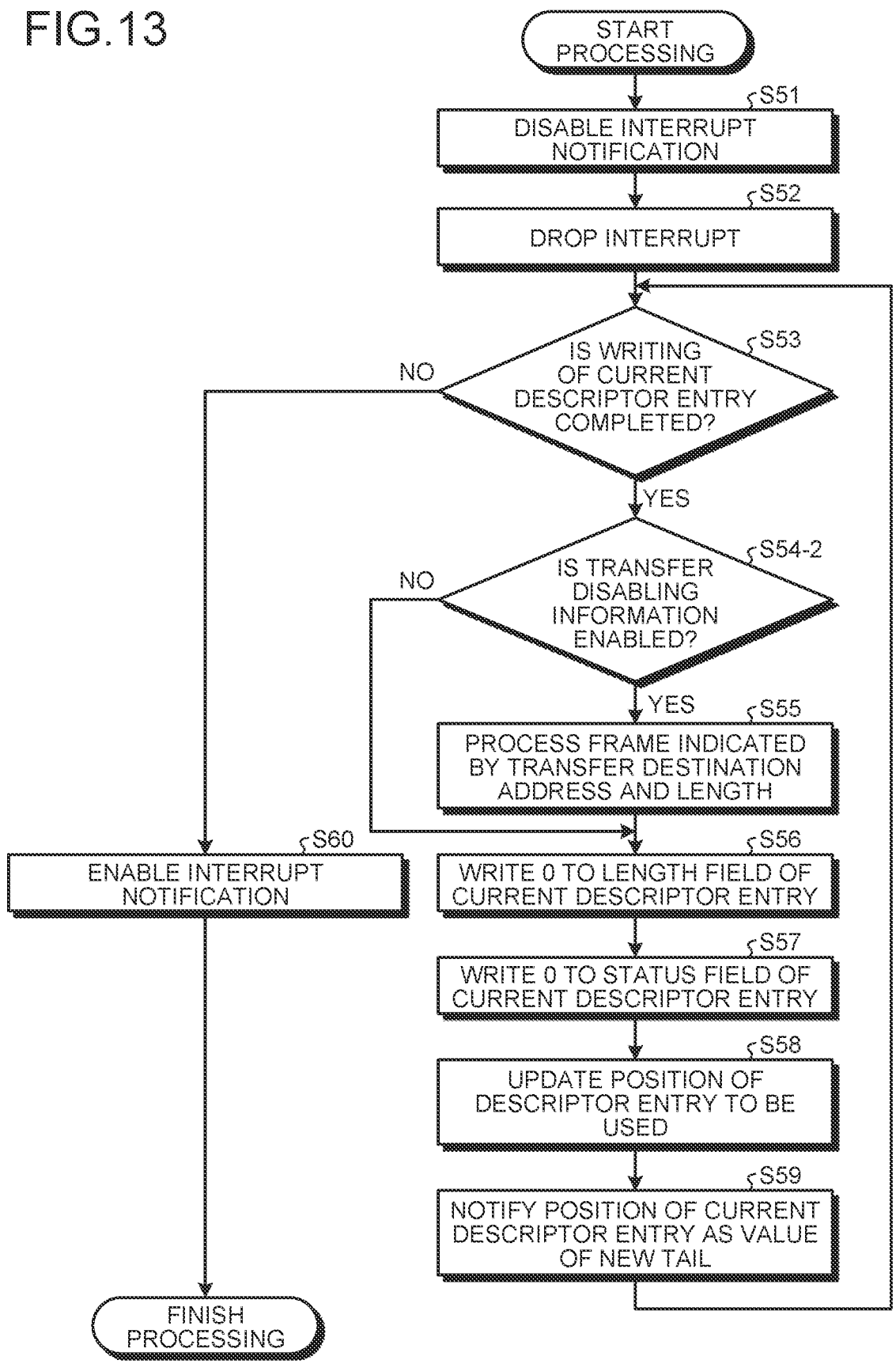
FIG. 13 is a flowchart illustrating an example of a frame reception process of a host processor in the second embodiment.

FIG. 13 is a flowchart illustrating an example of a frame reception process of the host processor 2 in the second embodiment. In the second embodiment, if the transfer disabling information in the status field is enabled (step S54-2), the frame will not be processed. More specifically, if one of the fault flag, the error flag, and the duplication flag is 1, the frame will not be processed.

In this manner, with the communication device 100 in the second embodiment, the detected results of duplication of the frame and an error in the frame can be transmitted to the status bit in the descriptor as the transfer disabling information. Hence, it is possible to perform data transfer immediately after receiving data, and reduce data transfer delay.

Third Embodiment

A third embodiment is different from the second embodiment in that the stream identification process, the de-duplication process, and the like performed on the network interface controller 4 side are performed by a host processor 2-2.

Example of Functional Configuration

Figure 14:
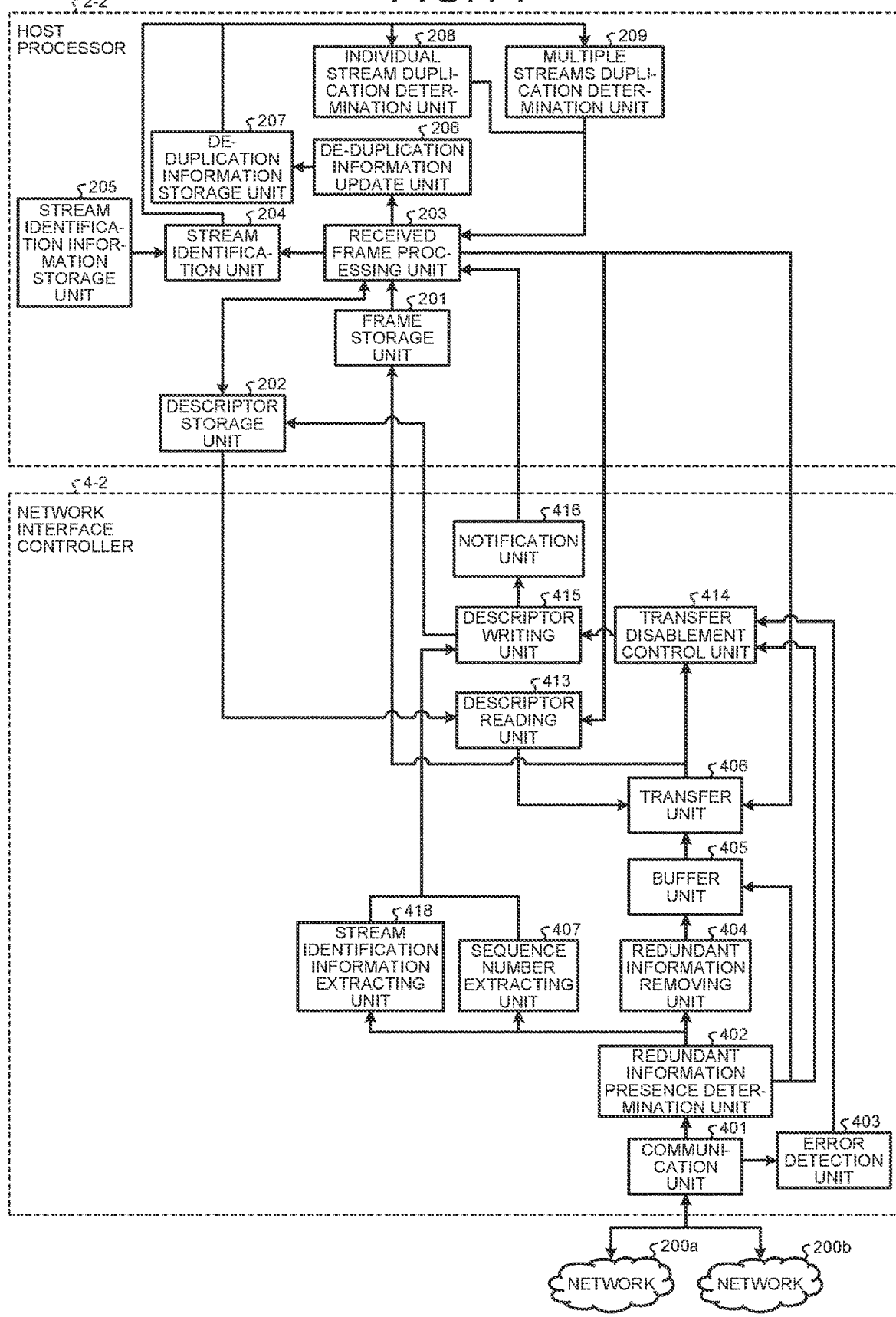
FIG. 14 is a diagram illustrating an example of a functional configuration of a communication device in a third embodiment.

FIG. 14 is a diagram illustrating an example of a functional configuration of the communication device 100 in the third embodiment. In the third embodiment, the host processor 2-2 includes a stream identification unit 204, a stream identification information storage unit 205, a de-duplication information update unit 206, a de-duplication information storage unit 207, an individual stream duplication determination unit 208, and a multiple streams duplication determination unit 209.

The third embodiment is different from the first embodiment in that, instead of a network interface controller 4-2, the host processor 2-2 performs a de-duplication process using the sequence number transmitted through the descriptor, which will be described below, and stream identification data. However, the functions of the units in the third embodiment are the same as those in the first embodiment.

In the third embodiment, a stream identification information extracting unit 418 is provided in the network interface controller 4-2. The stream identification information extracting unit 418 extracts data used for identifying a stream in a frame that has been made redundant. For example, the stream identification information extracting unit 418 extracts information used for identifying a stream described in the first embodiment such as the transmission destination MAC address and VLAN ID. The descriptor writing unit 415 stores the extracted data and the sequence number extracted by the sequence number extracting unit 407 in the descriptor as the duplication determination information of the descriptor, which will be described below, and transmits the information to the host processor 2-2.

Figure 15:
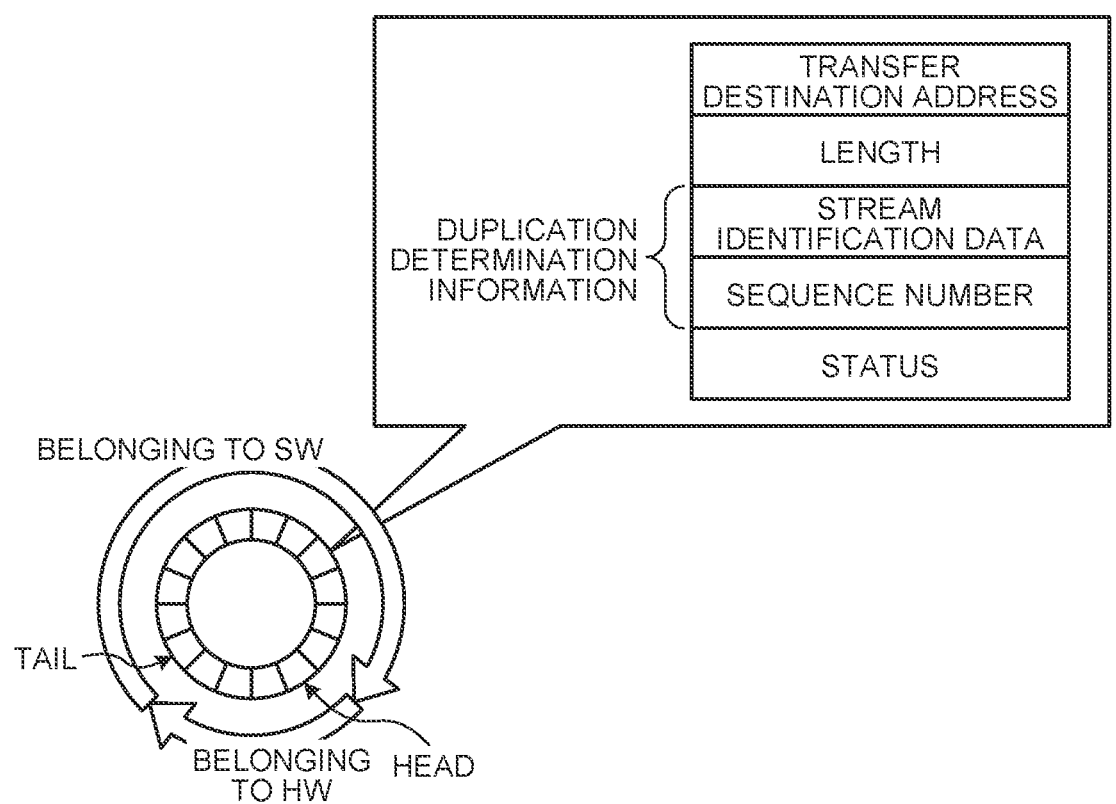
FIG. 15 is a diagram illustrating an example of a descriptor in the third embodiment.

FIG. 15 is a diagram illustrating an example of a descriptor in the third embodiment. In the third embodiment, a stream identification data field and a sequence number field are added to the descriptor entry in the second embodiment.

Figure 16:
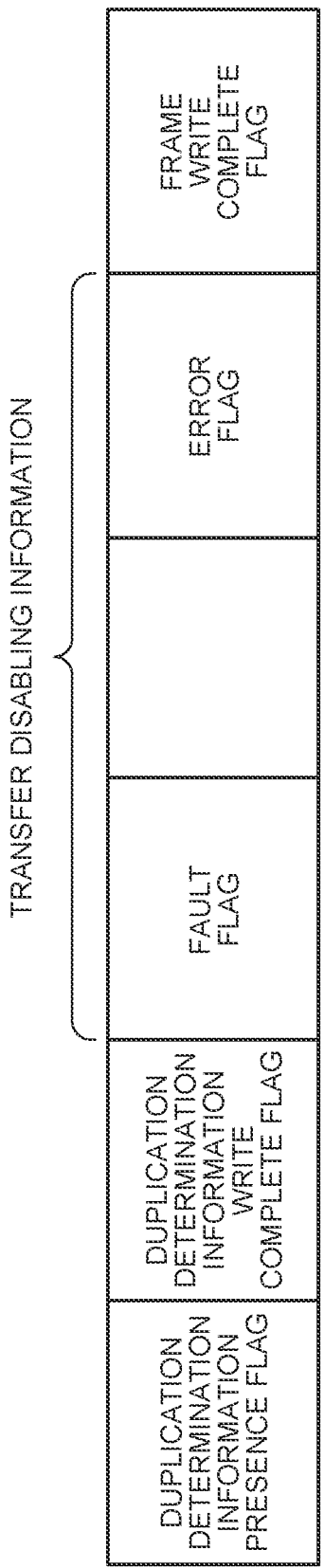
FIG. 16 is a diagram illustrating an example of status in the descriptor in the third embodiment.

FIG. 16 is a diagram illustrating an example of status in the descriptor in the third embodiment. In the third embodiment, in addition to the examples illustrated in the first and second embodiments, a duplication determination information presence flag and a duplication determination information write complete flag are provided.

Figure 17:
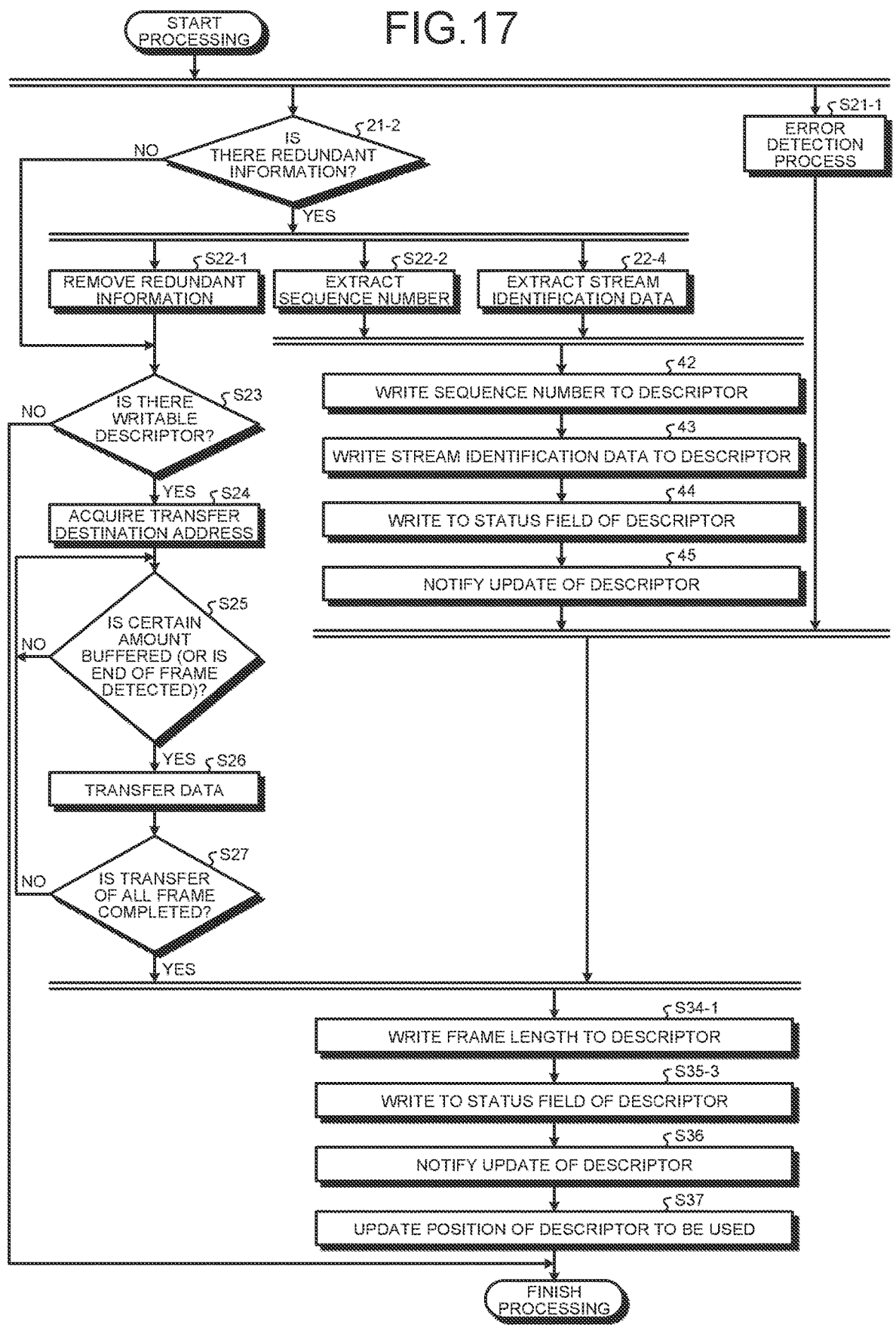
FIG. 17 is a flowchart illustrating an example of a frame reception process of a network interface controller in the third embodiment.

FIG. 17 is a flowchart illustrating an example of a frame reception process of the network interface controller 4-2 in the third embodiment. In this example, only different points from the second embodiment will be described. In the third embodiment, the host processor 2-2 identifies a stream. Thus, the network interface controller 4-2 only extracts the stream identification data used for identifying a stream.

First, the descriptor writing unit 415 writes the sequence number and the stream identification data obtained from the sequence number extracting unit 407 and the stream identification information extracting unit 418 into the corresponding fields in the descriptor as duplication determination information (step S42 and step S43).

Next, the descriptor writing unit 415 writes a duplication determination information presence flag and a duplication determination information write complete flag in the status field of the descriptor (step S44). If there is redundant information, the descriptor writing unit 415 sets the duplication determination information presence flag to 1, and if there is no redundant information, the descriptor writing unit 415 sets the duplication determination information presence flag to 0. Then, 1 is set in the duplication determination information write complete flag.

Next, the descriptor writing unit 415 notifies the host processor 2 that the descriptor is written via the notification unit 416, using an interrupt and the like (step S45). Upon finishing the processes at step S45, step 21-1, and step S27, the descriptor writing unit 415 writes the frame length to the descriptor (step 34-1).

In the process after the frame length is written to the descriptor, the descriptor writing unit 415 writes the fault flag, the error flag, and the write complete flag in the status field of the descriptor (step S35-3).

Figure 18A:
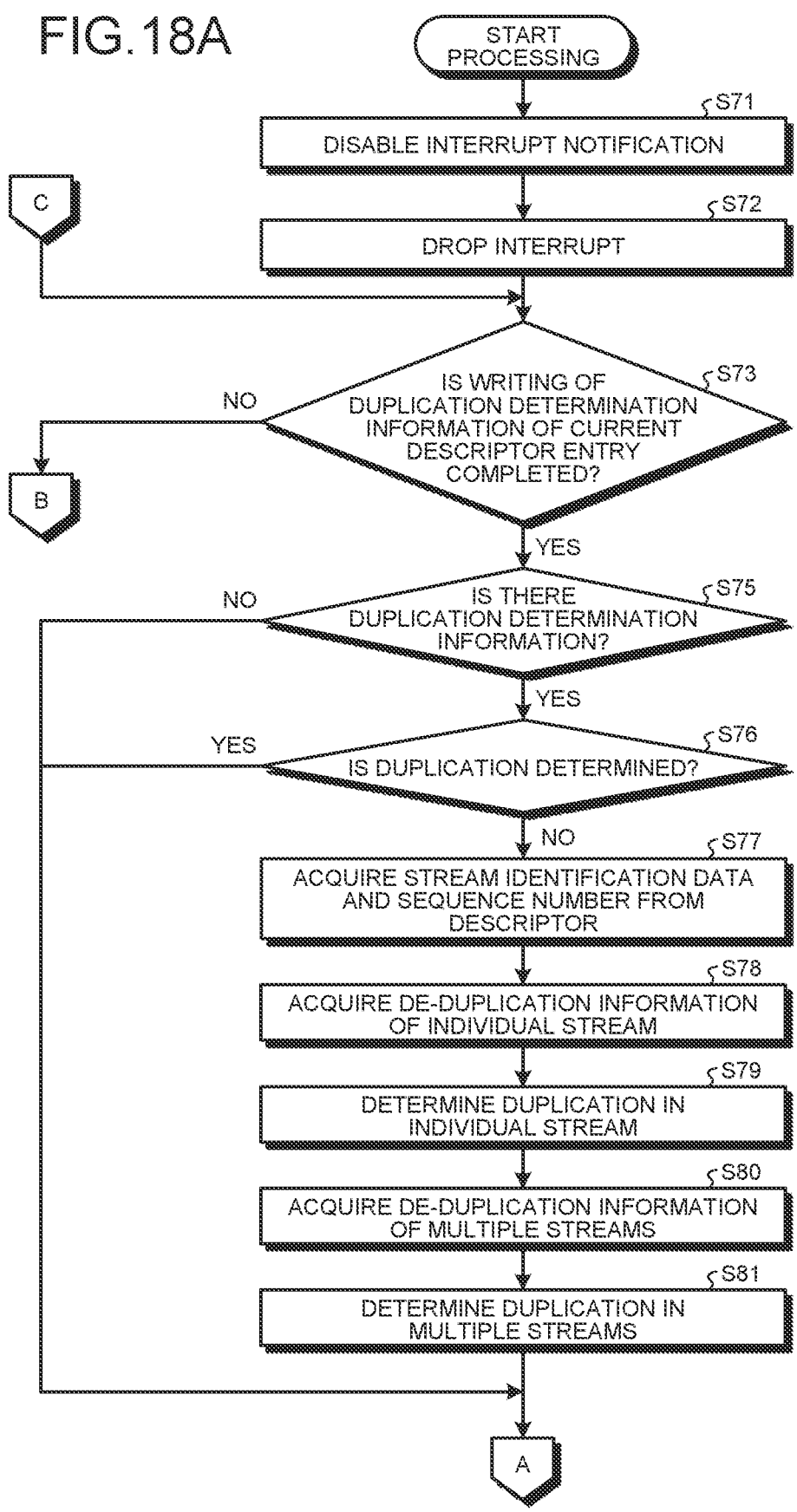
FIG. 18A is a flowchart illustrating an example of a frame reception process of a host processor in the third embodiment.
Figure 18B:
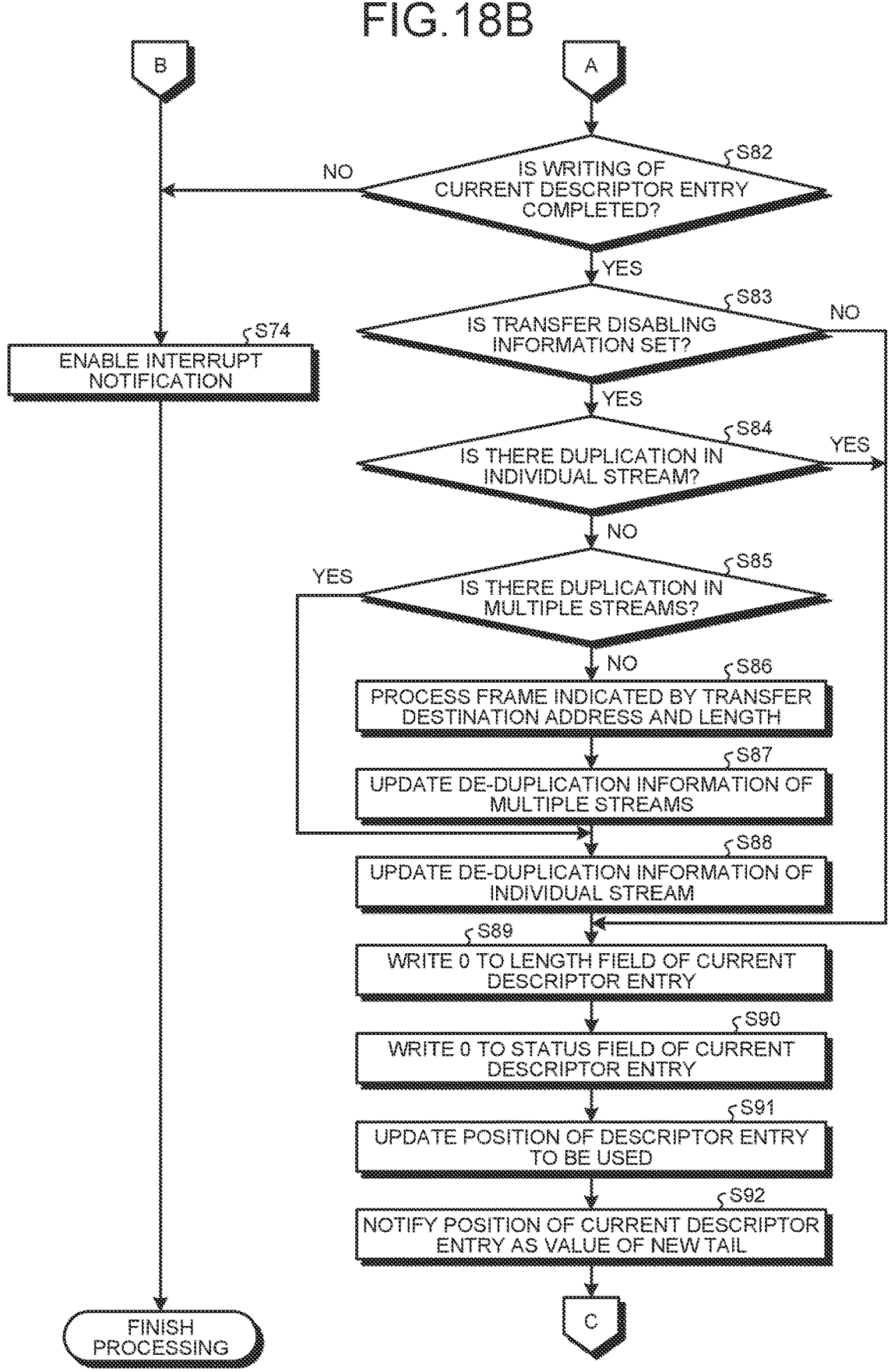
FIG. 18B is a flowchart illustrating an example of the frame reception process of the host processor in the third embodiment.

FIGS. 18A and 18B are flowcharts each illustrating an example of a frame reception process of the host processor 2-2 in the third embodiment. In this example, only different points from the second embodiment will be described.

The received frame processing unit 203 checks the duplication determination information write complete flag in the status field in the current descriptor entry (step S73). If the writing is not completed (write flag is 0) (No at step S73), the received frame processing unit 203 enables the interrupt (step S74), and finishes the process.

If the writing is completed (write flag is 1) (Yes at step S73), the received frame processing unit 203 checks the duplication determination information presence flag in the status field, and checks the presence of the duplication determination information (step S75). If there is duplication information (duplication determination information presence flag is 1) (Yes at step S75), the received frame processing unit 203 then checks whether the duplication determination process has previously finished (step S76).

If the duplication determination is not finished (duplication determination write complete flag is 0), the received frame processing unit 203 acquires the stream identification data and the sequence number of the descriptor (step S77). The stream identification unit 204 acquires a stream handle corresponding to the received frame, from the acquired stream identification data, and the stream identification information stored in the stream identification information storage unit 409.

Next, the individual stream duplication determination unit 208 and the multiple streams duplication determination unit 209 acquire de-duplication information of the individual stream and de-duplication information of the multiple streams from the de-duplication information storage unit 207 using the stream handle (step S78 and step S80), and each determine whether the sequence number of the received frame has been received in the individual stream and the multiple streams (step S79 and step S81).

Upon finishing the duplication determination, the received frame processing unit 203 checks whether the frame write complete flag in the status field of the current descriptor entry is complete (1) (step S82).

If it is completed (Yes at step S82), the received frame processing unit 203 checks whether the transfer disabling information is set (step S83). In this example, if 1 is set in the error flag, the fault flag, and the like, the received frame processing unit 203 does not receive the frame.

If the transfer disabling information is not set (No at step S83), the received frame processing unit 203 determines whether duplication is detected in the individual stream (step S84). If duplication is detected (Yes at step S84), the received frame processing unit 203 does not receive the frame. If duplication is not detected in the individual stream (Yes at step S84), the received frame processing unit 203 determines whether duplication is detected in the multiple streams (step S85).

If duplication is not detected in the multiple streams (No at step S85), the received frame processing unit 203 receives the frame (step S86), updates the de-duplication information of the multiple streams (step S87), and updates the de-duplication information of the individual stream (step S88). In the update process of the de-duplication information, the sequence number of the received frame will be recorded.

If duplication is detected in the multiple streams (Yes at step S85), the de-duplication information of the individual stream is updated (step S88).

In this manner, the different points from the second embodiment have been described.

In this manner, in the host processor 2-2 (example of the processor) in the third embodiment, the frame storage unit 201 stores the frame transferred from the transfer source. The descriptor storage unit 202 (example of the meta-information storage unit) stores the meta-information including the transfer disabling information indicating whether the transfer of the frame is to be disabled, the duplication determination information indicating whether duplication of the frame is to be determined, the stream identification data on a stream including at least one frame, and the sequence number of the frame. The stream identification unit 204 identifies a stream by the stream identification data. If the individual stream duplication determination unit 208 and the multiple streams duplication determination unit 209 (examples of the duplication determination unit) determine whether duplication of the frame is to be determined on the basis of the duplication determination information, and if duplication of the frame is to be determined, it is determined whether the frame has been previously received in the stream identified by the stream identification data, using the sequence number. If the transfer disabling information does not indicate that the transfer is disabled, and if the frame has not been previously received, the received frame processing unit 203 will process the frame.

According to the communication device 100 in the third embodiment, it is possible to transmit the results of the error detection to the status bit in the descriptor as the transfer disabling information afterwards, while duplicating the frame in the host processor 2-2. Hence, it is possible to perform data transfer immediately after receiving data and reduce data transfer delay.

Modification of Embodiment

In the embodiments described above, the transfer unit 406 and the error detection unit 403 are different operation units. However, the transfer unit 406 may include the error detection function, and may detect an error while performing data transfer.

A received filter determination unit that performs ingress filtering defined in IEEE 802.1Q may also be provided. If the received filter determination unit is included, and if the received filter determination unit determines that the received filter is an object to be filtered, the transfer disablement control unit 414 disables the transfer.

In the embodiment described above, the data transfer is performed by the transfer unit 406 to the end of the frame. However, for example, if the individual stream duplication determination unit 411, the multiple streams duplication determination unit 412, and the like determine that there is duplication, the data transfer may be stopped.

In the embodiment described above, a frame is transferred from the network interface controller 4 (4-2) to the host processor 2 (2-2). However, the configuration and method of the frame transfer of the embodiments are also applicable to the frame transfer in addition to between the network interface controller 4 and the host processor 2. For example, the configuration and method of the frame transfer of the embodiments are also applicable to the frame transfer within the network interface controller 4. Moreover, for example, the configuration and method of the frame transfer of the embodiments may be applicable to the frame transfer from the network interface controller 4 to another network interface controller 4. Furthermore, for example, the configuration and method of the frame transfer of the embodiments may be applicable to the transfer between the modules in the network switch.

In the embodiments described above, IEEE 802.1CB is used. However, instead of using IEEE 802.1CB, the packet replication and elimination function (PREF) standardized in internet engineering task force (IETF) and deterministic networking (Detnet) may also be used.

Example of System Configuration

Figure 19:
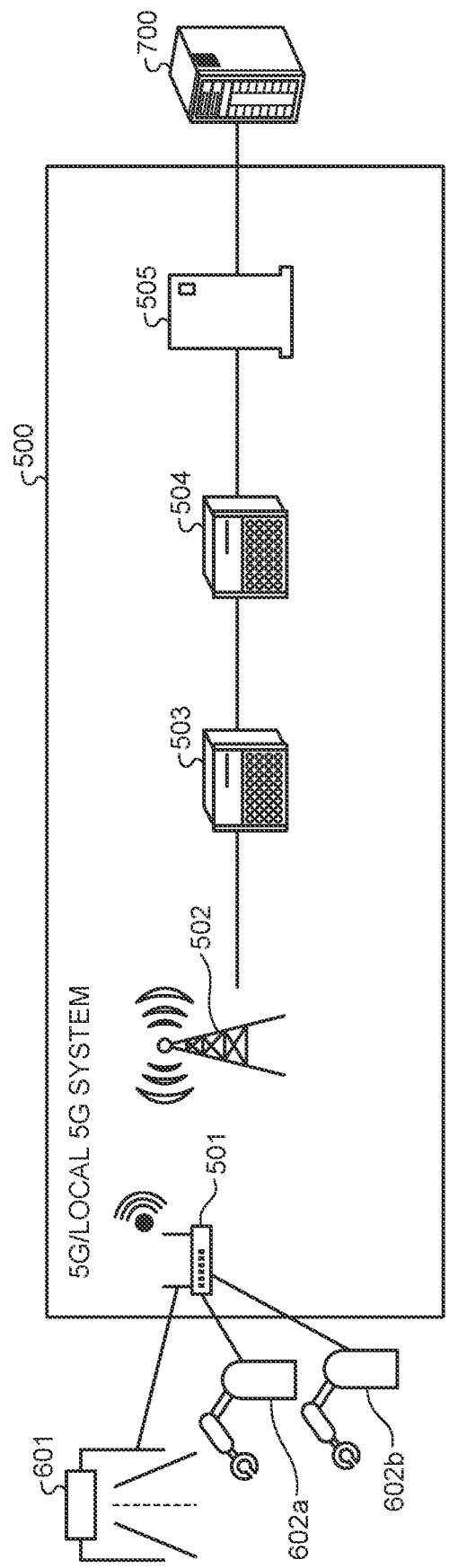
FIG. 19 is a diagram illustrating a configuration example of a system using the communication device of the first to third embodiments.

FIG. 19 is a diagram illustrating a configuration example of a system using the communication device 100 of the first to third embodiments. FIG. 19 is an example of controlling robot arms 602a and 602b, and a belt conveyor 601 at the factory or plant site, from an edge server 700 via a 5th generation (5G)/Local 5G (Private 5G) system 500.

The 5G/Local 5G system 500 includes a 5G core network 505, a central unit 504, a distributed unit 503, a remote unit 502, and a user equipment 501. The 5G/Local 5G system 500 performs 5G communication defined in a third generation partnership project (3GPP) standard.

For example, the communication device 100 in the first to third embodiments can be implemented in the edge server 700 and the 5G core network 505. Hence, it is possible to improve the real-time performance of communication between the edge server 700 and the 5G core network 505.

Moreover, the communication device 100 in the first to third embodiments may be used for communication between the units in the 5G/Local 5G system 500. That is, to perform communication between the remote unit 502, the distributed unit 503, the central unit 504, and the 5G core network 505, the communication device 100 in the first to third embodiments may be mounted on at least part of the remote unit 502, the distributed unit 503, the central unit 504, and the 5G core network 505.

The communication device 100 in the first to third embodiments may be used for communication between at least one of the belt conveyor 601 and the robot arms 602a and 602b, and the user equipment 501, or communication between the belt conveyor 601 and the robot arms 602a and 602b.

The system to which the communication device 100 in the first to third embodiments is applicable is not limited thereto, and the communication device 100 in the first to third embodiments may be applicable to any system. For example, the communication device 100 in the first to third embodiments is also applicable to the industrial network system in the factory or plant not using 5G/Local 5G, and the network system in a vehicle and an aircraft.

A computer program executed by the communication device 100 according to the first to third embodiments is provided by being incorporated in the storage 3, a read-only memory (ROM), and the like in advance. When the communication device 100 is implemented by the FPGA, for example, data (configuration data) for setting the configuration of the FPGA corresponds to the computer program.

A computer program executed by the communication device 100 according to the first to third embodiments may be recorded in a computer readable recording medium such as a compact disc read only memory (CD-ROM), a flexible disk (FD), a compact disc recordable (CD-R), a digital versatile disc (DVD), and the like, in an installable or executable file format, and provided as a computer program product.

Moreover, a computer program executed by the communication device 100 according to the first to third embodiments may be stored in a computer connected to a network such as the Internet, and provided by being downloaded via the network. Furthermore, a computer program executed by the communication device 100 according to the first to third embodiments may be provided or distributed via a network such as the Internet.

A computer program executed by the communication device 100 according to the first to third embodiments may cause a computer to function as the units in the communication device described above. The processor of the computer can read a computer program from a computer-readable storage medium onto a main storage device and execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device comprising:
communication circuitry that receives a frame;
error detection circuitry that performs an error detection process of detecting an error in the frame;
transfer circuitry that transfers the frame to frame storage of a transfer destination without waiting for completion of the error detection process; and
transfer disablement control circuitry that, when an error is detected by the error detection circuitry, disables transfer by the transfer circuitry,
wherein
when not disabling the transfer by the transfer circuitry, the transfer disablement control circuitry updates meta-information of the transferred frame, and when disabling the transfer by the transfer circuitry, the transfer disablement control circuitry does not update the meta-information of the transferred frame, and
when the meta-information is updated, the transfer disablement control circuitry notifies the transfer destination that the meta-information is updated, and when the meta-information is not updated, the transfer disablement control circuitry does not notify the transfer destination of updating of the meta-information.

2. The device according to claim 1, wherein when disabling the transfer by the transfer circuitry, the transfer disablement control circuitry transmits transfer disabling information indicating that the transferred frame is disabled to the transfer destination.

3. The device according to claim 1, further comprising:
redundant information presence determination circuitry that determines whether the frame includes redundant information indicating that the frame has been made redundant; and
redundant information removing circuitry that, when the frame includes the redundant information, removes the redundant information from the frame, wherein
the transfer circuitry transfers the frame from which the redundant information is removed to the frame storage of the transfer destination.

4. The device according to claim 3, further comprising:
stream identification circuitry that identifies a stream including at least one frame;
sequence number extracting circuitry that extracts a sequence number from the redundant information; and
duplication determination circuitry that determines whether a frame has been previously received in the stream, using the sequence number, wherein
the transfer disablement control circuitry disables the transfer by the transfer circuitry when the duplication determination circuitry determines that the frame has been previously received.

5. The device according to claim 4, wherein
the duplication determination circuitry includes:
individual stream duplication determination circuitry that performs duplication determination on an individual stream; and
multiple streams duplication determination circuitry that performs duplication determination on multiple streams, and
the transfer disablement control circuitry disables the transfer by the transfer circuitry, when it is determined that the frame has been previously received, by at least one of the individual stream duplication determination circuitry and the multiple streams duplication determination circuitry.

6. The device according to claim 1, wherein the error detection circuitry calculates a cyclic redundancy code (CRC) for a field other than a frame check sequence (FCS) field of the frame, and determines that there is the error when the FCS does not match with the CRC.

7. A processing device comprising:
frame storage that stores, without waiting for completion of an error detection process of detecting an error in a frame, the frame transferred from a transfer source;
meta-information storage that stores meta-information including transfer disabling information indicating whether the transfer of the frame is to be disabled, duplication determination information indicating whether duplication of the frame is to be determined, stream identification data on a stream including at least one frame, and a sequence number of the frame; and
a hardware processor configured to:
identify a stream by the stream identification data;
determine whether duplication of the frame is to be determined, based on the duplication determination information, and when the duplication of the frame is to be determined, determines whether the frame has been previously received in the stream identified by the stream identification data, using the sequence number; and
when the transfer disabling information, which indicates that the transfer is to be disabled after the error is detected by the error detection process, does not indicate that the transfer is to be disabled and when the frame has not been previously received, process the frame.

8. A communication method comprising:
by a communication device, receiving a frame;
by the communication device, performing an error detection process of detecting an error in the frame;
by the communication device, transferring the frame to frame storage of a transfer destination without waiting for completion of the error detection process; and
by the communication device, when an error is detected by the error detection process, disabling the transferring,
wherein the method further comprises:
when not disabling the transferring, updating meta-information of the transferred frame, and when disabling the transferring, not updating the meta-information of the transferred frame, and
when the meta-information is updated, notifying the transfer destination that the meta-information is updated, and when the meta-information is not updated, not notifying the transfer destination of updating of the meta-information.

9. A computer program product having a non-transitory computer readable medium including programmed instructions, wherein the instructions, when executed by a computer, cause the computer to execute:
receiving a frame;
performing an error detection process of detecting an error in the frame;
transferring the frame to frame storage of a transfer destination without waiting for completion of the error detection process; and
when an error is detected by the error detection process, disabling the transferring, wherein the instructions cause the computer to further execute:

when not disabling the transferring, updating meta-information of the transferred frame, and when disabling the transferring, not updating the meta-information of the transferred frame, and when the meta-information is updated, notifying the transfer destination that the meta-information is updated, and when the meta-information is not updated, not notifying the transfer destination of updating of the meta-information.

10. A computer program product having a non-transitory computer readable medium including programmed instructions, wherein the instructions, when executed by a computer, cause the computer to execute:

storing, without waiting for completion of an error detection process of detecting an error in a frame, the frame transferred from a transfer source;

storing meta-information including transfer disabling information indicating whether the transfer of the frame is to be disabled, duplication determination information indicating whether duplication of the frame is to be determined, stream identification data on a stream including at least one frame, and a sequence number of the frame;

identifying a stream by the stream identification data;

determining whether duplication of the frame is to be determined based on the duplication determination information, and when the duplication of the frame is to be determined, determining whether the frame has been previously received in the stream identified by the stream identification data, using the sequence number; and when the transfer disabling information, which indicates that the transfer is to be disabled after the error is detected by the error detection process, does not indicate that the transfer is to be disabled and when the frame has not been previously received, processing the frame.

\* \* \* \* \*